United States Patent [19]

Kemper

[11] E Re. 30,981

[45] Reissued Jun. 29, 1982

[54] TRANSMISSION DEVICES

[75] Inventor: Yves Kemper, Birmingham, Mich.

[73] Assignee: Vadetec Corporation, Troy, Mich.

[21] Appl. No.: 48,182

[22] Filed: Jun. 13, 1979

Related U.S. Patent Documents

Reissue of:

[64] Patent No.: 4,152,946
Issued: May 8, 1979
Appl. No.: 706,291
Filed: Jul. 19, 1976

U.S. Applications:

[63] Continuation-in-part of Ser. No. 598,625, Jul. 24, 1975, abandoned.

[30] Foreign Application Priority Data

| | | | |
|---|---|---|---|
| Jul. 29, 1974 | [CH] | Switzerland | 10432/74 |
| Aug. 1, 1975 | [FR] | France | 75 24130 |
| Apr. 21, 1976 | [FR] | France | 76 11753 |
| Jul. 12, 1976 | [FR] | France | 76 21298 |
| Jul. 12, 1976 | [FR] | France | 76 21299 |

[51] Int. Cl.[3] ..... F16H 15/16; F16H 15/08

[52] U.S. Cl. ..... 74/193; 74/196

[58] Field of Search ..... 74/190, 190.5, 191, 74/193, 194, 196, 200, 202, 206, 208, 796

[56] References Cited

U.S. PATENT DOCUMENTS

| | | | |
|---|---|---|---|
| 1,771,806 | 7/1930 | Mitchell | 74/191 X |
| 1,981,910 | 11/1934 | Ehrlich | 74/200 |
| 2,178,399 | 10/1939 | Madle | 74/796 |
| 2,203,637 | 6/1940 | Schmitter et al. | 74/796 |
| 2,319,319 | 5/1943 | Graham | 64/7 |
| 2,328,536 | 9/1943 | Bade | 74/796 |
| 2,405,957 | 8/1946 | Jones | 74/281 |
| 2,457,431 | 12/1948 | Bade | 74/796 |
| 2,535,409 | 12/1950 | Graham | 74/796 |
| 2,682,776 | 7/1954 | Morgan | 74/198 |
| 2,974,547 | 3/1961 | Egan | 74/796 |
| 3,108,496 | 10/1963 | Kashihara | 74/796 |
| 3,207,004 | 9/1965 | Chery | 74/796 |
| 3,224,285 | 12/1965 | Maichen | 74/192 |
| 3,224,300 | 12/1965 | Chery | 74/190.5 X |
| 3,242,748 | 3/1966 | Prager | 74/200 |
| 3,261,219 | 7/1966 | Kraus | 74/200 |
| 3,298,238 | 1/1967 | Lea | 74/191 |
| 3,302,474 | 2/1967 | Edlich | 74/200 |
| 3,413,864 | 12/1968 | Magill et al. | 74/200 |
| 3,677,109 | 7/1972 | Stuemky | 74/208 X |
| 3,793,910 | 2/1974 | Nasvytis | 74/796 |
| 3,955,432 | 5/1976 | Kemper | 74/796 X |

FOREIGN PATENT DOCUMENTS

| | | |
|---|---|---|
| 151142 | 4/1953 | Australia . |
| 1227486 | 8/1960 | France . |
| 46-28931 | 8/1971 | Japan . |
| 46-28932 | 8/1971 | Japan . |

*Primary Examiner*—C. J. Husar
*Assistant Examiner*—Moshe I. Cohen
*Attorney, Agent, or Firm*—Robert F. Ziems

[57] ABSTRACT

A transmission device includes a first element having rolling surfaces of revolution on a first axis, a second element having surfaces of revolution on a second axis intersecting the first axis at an acute angle equal to or slightly larger than an apex half-angle of each of a pair of generally conical surfaces on one of the elements. The rolling surfaces of both elements are symmetrically disposed axially on each side of the point of intersection. The second element is mounted such that its axis may perform conical movement about the axis of the other element. The second element may be allowed a degree of freedom to pivot about the point of intersection of the axes and in the plane containing the axes, so that during operation of the device, a gyroscopic couple of the body causes it to pivot so that the cone surfaces and their respective rolling surfaces come into rolling engagement at points one each side of the point of intersection of the axes. Alternatively, the same gyroscopic couple may be used to counterbalance forces by which the rolling surfaces are held in frictional contact by mechanical means where no pivotal freedom is provided. The annular rolling surfaces may be axially movable apart to alter the transmission ratio. Drive input and output means are coupled to either the rotation of the body about its axis, rotation of the second element conically about the point on the first axis and circumferentially of the longitudinal axis, or the rotation of the rolling surfaces about their axes. Two or more rotating units may be coupled together in such a way that the resultant or composite moment along the axis of the transmission is zero.

69 Claims, 32 Drawing Figures

TRANSMISSION DEVICES

Matter enclosed in heavy brackets [ ] appears in the original patent but forms no part of this reissue specification; matter printed in italics indicates the additions made by reissue.

CROSS-REFERENCE TO RELATED APPLICATION

This application is a continuation-in-part of U.S. application Ser. No. 598,625 filed on July 24, 1975 by the present inventor, now abandoned.

BACKGROUND OF THE INVENTION

This invention relates to transmission devices. More particularly the invention relates to transmission devices of the type including a frame, a first element having a first axis fixed relative to the frame, and a second element rotatable about a second axis intersecting the first axis, the second axis being arranged for nutation about the first axis with the apex of the cone of nutation being the point of axes intersection. The first element has rolling surfaces of revolution disposed about the first axis and the second element has rolling surfaces of revolution disposed around the second axis. Provision is made for bringing the rolling surfaces of revolution around the axes into rolling engagement and drive input or output means is connected to at least one of the first and second elements.

In U.S. Pat. No. 3,955,432 issued May 11, 1976 to the present inventor, there is disclosed a transmission having a first element defining a pair of rolling surfaces of revolution about a first axis, a second element having a pair of rolling surfaces of revolution on a second axis intersecting the first axis and including a mechanical system for urging the rolling surfaces of the second element against those of the first element, which system is gyroscopic in origin. Specifically, gyroscopic means are associated with the second element to develop a gyroscopic couple which acts to retain the rolling surfaces of the second element against the rolling surfaces of the first element at two points located one on each side of a plane perpendicular to the first axis at the point of intersection thereof with the second axis. The gyroscopic forces thus developed are a combined function of the moment of inertia of the second element with respect to the second axis, the angle at which the first and second axes intersect, the rotational velocities of the second element around the second axis and nutational velocity of the second axis around the first axis. In this transmission, the gyroscopic force couple operates to both rock the second element around the point of axes intersection and maintain both rolling surfaces of the second element against both such surfaces of the first element in rolling friction contact.

To vary the ratio of input and output speeds of the transmission disclosed in this patent, provision is made to modify the angle of inclination of the second axis with respect to the first axis. As a result, the ratio of the radii of circles described by the points of rolling surface contact between the first and second elements, respectively, will be modified. Such a transmission is particularly well suited for the transmission of large forces due to the development of normal contact pressure by the gyroscopic forces while avoiding excessive axial forces on the transmission gear shafts as well as radial forces on the bearing supporting the second element.

Although the transmission disclosed in U.S. Pat. No. 3,955,432 possesses many desirable features, it is subject to certain drawbacks particularly when it necessary to vary the input and output speeds of the transmission over large ranges. This drawback is due primarily to the necessity for variation of the angle of inclination of the second axis with respect to the first axis. In other words, to obtain the rotary motion of the second element about its own axis as well as nutational movement of the second axis about the first axis, it is necessary to employ relatively complex mechanical coupling connections to the second element such as homokinetic joints, etc. In addition, the transmission of this patent is subject to drawbacks when the rotational velocity of the second axis about the first axis varies through transient ranges. During these transient ranges, the gyroscopic couple assumes values different from the nominal value in normal operation. The result is that the normal force creating the contact pressure deviates from its optimum value in such transient ranges. Although this drawback is of minor importance when the transmission operates continuously under normal conditions, it becomes a more serious problem when the transient ranges are more frequently incurred.

In U.S. Pat. Nos. 2,319,319, 2,405,957 and 2,535,409 transmission devices are described which comprise a plurality of second elements which are conical and convex in form and arranged in satellite manner about a first axis. The rolling surfaces of revolution formed on these conical elements are held in contact with an annular, toric, concave part at points of contact identical in number to the number of conical satellite elements. Each of these conical satellites is supported either at its two extremities by bearings located inside support plates having as their axis the first axis, as in U.S. Pat. No. 2,319,319, or at its small conical extremity by bearings located inside a support plate having as its axis the first axis, as in U.S. Pat. Nos. 2,405,957 and 2,535,409.

The pressure at the point of contact between the various conical satellites and the toric ring with which they cooperate is obtained by the combined effect of the centrifugal force acting on the conical satellites when the support plate or plates rotate and by a possible additional force applied radially to each of the satellites, such as springs, for example. In the transmission devices described in U.S. Pat. Nos. 2,319,319 and 2,405,957, the bearings are rotatably mounted inside the support plate so as to permit the satellite a certain degree of liberty in a radial plane. This arrangement allows the conical satellite to abut on the toric ring under the action of centrifugal force. In the transmission described in U.S. Pat. No. 2,535,409, the bearing in the support plate is blocked by means of a wedge system of such dimensions that it presses the conical satellites against the toric ring with a contact force which allows the transmission device to function in the absence of centrifugal force.

The concave toric ring is movable along its longitudinal axis, i.e. along the first axis, so as to modify the ratio of the radius $R^1$ of the circles described by the points of contact on the reaction surfaces of the satellites to the constant radius $R^2$ of the circles described by the points of contact of the reaction surface of the toric ring.

The rotation of the satellite support plate or plates draws each of these satellites in a movement around the surface of a cone with an apex angle a and having as its axis the first axis. Each of these satellites abuts on the rolling surface of the ring at a single point of contact. As the ring is immobile, when rotating about the axis of the ring (the first axis), the satellites react by starting to turn on themselves about their own axis (the second axis). The combination of the driving speed of the conical movement of each of these satellites and its rotational speed about its own axis is transmitted, by a planetary geartrain, to a drive transmission shaft coaxial with the first axis.

The transmission devices of these last mentioned U.S. patents have the following features:

(a) The force perpendicular to the rolling surfaces and exerted at the point of contact is minimum when the $R^1:R^2$ ratio is high (point of contact at the large base of the cone, large contact surface), and is maximum when the $R^1:R^2$ ratio is low (point of contact at the small base of the cone, small contact surface). This results in considerable variations in the specific contact pressure.

(b) The axial and radial reaction forces balancing out the contact pressure are accommodated by the bearing blocks supporting the conical satellites. These forces are directed in one direction or the other, depending on whether the points of contact are located on one side or the other of the satellite center of gravity. These forces are generally considerable, as they are of the same order of magnitude as the perpendicular contact force. The result is that the bearing blocks supporting the satellites must be designed and dimensioned so as to accommodate substantial forces during operation. Accordingly, it is difficult to exert very large forces at the point of contact.

(c) In addition to the centrifugal force which helps to keep the conical satellite lying in frictional rolling contact with the toric ring, a gyroscopic couple is also generated. In the case of these known transmission devices, this couple produces an undesirable effect, as its influence reduces the pressure at the point of contact and increases the radial force to be accommodated by the bearing blocks supporting the conical satellites.

SUMMARY OF THE INVENTION

The aim of the invention is to eliminate or at least substantially reduce the drawbacks mentioned hereinbefore while retaining the advantages of transmission devices of these general types. More particularly, the invention concerns a transmission of these general types comprising a new mechanism for varying the speed ratio of the transmission.

According to the invention, there is provided a transmission device having a frame, a first element having a first axis fixed relative to the frame, and a second element rotatable about a second axis intersecting the first axis at a point thereon, the second axis being driven conically about the point on the first axis and circumferentially of the first axis. The first element has a pair of rolling surfaces of revolution disposed about the first axis, one on each side of a plane passing through the point of intersection of the axes and perpendicular to the first axis. The second element has a pair of rolling surfaces of revolution disposed about the second axis, one on each side of another plane passing through the point of intersection of the axes and perpendicular to the second axis. The rolling surfaces of revolution of one of the elements are essentially the surfaces of cones having an apex half-angle substantially equal to or less than the angle of intersection of the first and second axes. Drive input or output means is connected to at least one of said first and second elements.

The transmission of the present invention comprises also a mechanical system for creating the pressure contact between the rolling surfaces. This mechanical system may be realized in different ways. Preferentially this mechanical system comprises gyroscopic means or is associated with gyroscopic means. In fact, a complementary aim of the present invention is the advantageous deployment of the inertia phenomenon which occur in a body moving about a fixed point, the classic example of such phenomenon being identified in the operation of a gyroscope. The second element in the transmission of the invention is a body having a rotational movement about its axis (the second axis), such axis in turn having a conical rotation movement about the first axis (normally the general transmission axis), with the apex of such conical movement on the point of intersection of the two axes. This cone of movement is generally termed the cone of nutation.

The elemental inertia forces generated in the mass of the second element may be reduced—using the general laws of mechanics—to a couple and an applied force at the point of intersection of the axes.

(a) The applied force:

When the center of gravity of the second element substantially coincides with the point of intersection of the axes, the applied force is substantially zero. In the opposite case, the applied force is a turning force located in the plane perpendicular to the general transmission axis (the first axis). According to a preferred feature of the present invention therefore, the center of gravity of the second element is at or adjacent to the point of intersection of the axes so as to limit the intensity of the applied force.

It should be noted, on the other hand, that in the case of the transmission devices described in the above-mentioned U.S. patents, the center of gravity of the second element is very remote from the point of intersection of the axes, so as to create the greatest possible applied force. In fact, in the known transmission devices, it is chiefly because of this applied force that the second element is kept in rolling frictional contact with the first element.

(b) The couple:

The gyroscopic couple may be mathematically represented by a vector, the direction of which is perpendicular to the plane containing the first and second axes. Accordingly, this couple has the effect of pivoting the second element about an axis perpendicular to the plane containing the first and second axes.

In accordance with another desired feature of the invention, the second element is a substantially solid body rotating about the second axis having a transverse plane of symmetry perpendicular to the second axis at the point of intersection of the axes.

By applying the classic laws of the mechanics of solids, it is possible to calculate the moment of this couple (i.e. the modulus of the vector) in the case of a rotating solid body. This moment is given by the following formula:

$$CI=(I_1-I_3)Wa^2 \sin a \cos a - I_3\, Wa(Wa-Wb) \sin a$$

In this formula:

$I_1$ and $I_3$ designate the moments of inertia of the second element relative to the second axis and relative to an axis passing through the point of intersection of the axes and perpendicular to the second axis;

a designates the angle of inclination of the second axis relative to the first axis;

Wa designates the angular velocity of the second element about the first axis; and Wb designates the angular velocity of the second element about the second axis in a frame of reference which is fixed relative to the assembly.

The notation Wb*, though not used in the formula, but which will also be used below, designates the angular velocity of the second element about the second axis in a frame of reference which is linked to the rotating plane containing the first and second axes. Thus, in terms of Wb* and Wb, Wb* = Wb − Wa.

Similarly, the notation W, where used hereinafter, designates the velocity of the first element about the first axis.

The formula gives the intensity of the moment of the gyroscopic couple resulting from the total inertia forces. The formula is written in two parts so as to show, in the first part, the contribution made by inertia effects which may be termed "centrifugal". In fact, when Wa = Wb, the second part of the expression disappears, leaving only the first part, independent of the value of the angular velocity of the second element about its rotational axis (the second axis).

It should be generally noted that, in transmission devices according to the invention, Wa≠Wb (Wb*≠0).

The expression for the moment of the gyroscopic couple is an algebraic total. Consequently and depending on the value of each of the parameters, this couple may either act in a direction to press the second element against the first, or, on the other hand, act in a direction tending to oppose movement of the second element against the first.

In other words, the different parameters, such as the shape of the second element affecting ($I_1$, $I_3$), the angular velocity (Wa, Wb), and the angle of conical movement a for each embodiment, may be proportioned so as to obtain a couple with an intensity equal to that needed to hold the second element in place against the first and variable in proportion to the power to be transmitted by the transmission device.

Calculation of the structural and kinematic parameters of the aforementioned second element to determine the gyroscopic properties thereof and in particular, the direction and intensity of the force couple developed by movement of the second element, lies within the capability of one skilled in the art relating to the gyroscopic devices by direct application of the aforementioned formula. In accordance with one of the basic principles underlying the present invention, therefore, the direction and intensity of the gyroscopic force couple are selected either to hold directly the force transmitting rolling surfaces of the respective first and second elements one against the other or to counter-balance the forces under which such surfaces are held one against the other by mechanical means incorporated in certain embodiments of the invention.

It is contemplated that many embodiments of the present invention are possible and may differ in that the direction of the gyroscopic couple is employed to retain the respective rolling surfaces of the first and second element one against the other or in that the same couple is deployed to counter-balance the forces by which said rolling surfaces are retained against each other. In the preferred embodiments of the present invention, however, one of the elements is of generally biconical configuration to establish generally conical surfaces of revolution symmetrical about a transverse axis passing through the axes of intersection of the first and second elements, each such conical surface having an apex half-angle no greater than the angle at which the axes of the first and second elements intersect.

It is not essential for the second element to be located inside the first element or that the second element be convex and the first element concave in the transverse plane. A transmission device is contemplated according to the invention wherein the first element is located inside the second element, i.e. a transmission device wherein the rolling surfaces of the first element are generally convex in shape and those of the second element are generally concave in shape in the transverse plane. Similarly, a transmission device according to the invention might be such that, in a meridian plane (i.e. a radial plane including the first axis), the general forms of the rolling surfaces would be concave or convex rather than linear. In other words, a surface which may appear generally conical in illustrative drawings is not restricted to the surface generated solely by revolution of a straight line, but rather is inclusive of surfaces which may be slightly convex or concave, such as where the generatrix of the surface is a curve. Such convex or concave surfaces may be employed so long as they permit the transmission ratio to be varied without changing the angle of inclination of the axis of the second element with respect to the axis of the first. When used in this specification and claims, therefore, a reference to cones or to conical surfaces shall be construed as embracing not only cones whose surface is linear but convex or concave subject to the foregoing limitation. In the case of such convex or concave surfaces, the apex half-angle of the cone shall be treated as the average value of the angle of the tangents to the generatrix of each said surface with respect to the axis of revolution of the surface.

The choice of the radii of curvature of the reaction surfaces in the transverse and meridian planes, all other factors being equal, permits ranges of variation in output velocity which are different for a given breadth of variation of the ratio (R1/R2), different laws of variation of the power transmitted as a function of the output velocity, and different load transmissions. Thus, it is possible to adapt a transmission device according to the invention to the desired operating conditions.

Although it is obviously necessary for the transmission device to comprise at least two drive transmission shafts, one for input and one for output, it is not essential that these drive transmission shafts be rotatably connected to the first and second elements respectively. In fact, it is perfectly possible for one of the drive transmission shafts to be linked to the rotational movement of angular velocity Wb* of the second element about its axis (i.e. the second axis) and for the other drive transmission shaft to be linked to the rotation, of angular velocity Wa, of the second element about the first axis (i.e. the second axis about the first axis).

The first element may be either fixed, or rotatable about the first axis. If it is necessary for the second element to be rotatable, with a velocity Wa, about the first axis, it is still not essential for the first element to be rotatable about this axis. By contrast, it shold be noted that where the first element is rotatable about the first axis, it is possible to link it rotatably to a drive transmission shaft and to block the rotation of the drive transmission shaft linked to the movement of rotation, of angular velocity Wb*, of the second element about its axis (i.e. the second axis).

The first and second elements could be linked in other different ways to drive transmission shafts. It should be specified here that the expression "rotatably linked," as used in the present description and in the claims, refers to identical angular velocities or angular velocities in a given constant ratio or in a given variable ratio, while the expression "mounted for rotation with" refers to identical angular velocities.

According to a further subsidiary feature of the invention, the drive transmission shaft (the first shaft) may be rotatably linked to the second element by providing the first drive transmission shaft with a single truncated cylindrical part having as its axis the said first axis, and having at each end a respective support plate, the second element being provided with a pair of coaxial half shafts fixed relative thereto and rotatably supported in bearings on the respective support plates, the axis of the half shafts being the said second axis. Preferably in this embodiment, the bearings in which the two half-shafts are supported are mounted inside sleeves which are prismatic in their external shape. The sleeves are mounted in said support plates with play in the plane containing the first and second axes, and with substantially no play in the direction perpendicular to this plane, whereby the second element is mounted on the support plates with a sufficient degree of freedom for it to be able to pivot about an axis perpendicular to the plane containing the first and second axes to bring the rolling surfaces of said first and second elements into engagement.

In another embodiment and according to another subsidiary feature of the invention, the first shaft is rotatably linked to the second element in that the first drive transmission shaft includes a first support plate having as its axis the first axis, and being immovably secured to one end of a support shaft having as its axis the second axis. The other end of the support shaft is immovably secured to a second support plate freely pivotable about the first axis independently of said first support plate, the second element being freely rotatable about the support shaft. Preferably in this embodiment, the support shaft passes through bearings mounted in a cage which is prismatic in its external form, and in turn mounted in said second element with play in the plane containing said first and second axes, but with no substantial play in the direction perpendicular to this plane, whereby the second element is mounted on the support shaft with a sufficient degree of freedom for it to pivot about an axis perpendicular to the plane containing the first and second axes.

When the second element is movable by rotation, with a velocity Wb* about the second axis, it may be rotatably linked to a second shaft in different ways, and all the more simply because the angle of inclination a of the second axis relative to the first axis is substantially constant (excluding the adequate play in certain embodiments giving the second element the required degree of freedom in the radial plane). It may be rotatably linked to the second shaft via a gear-train, constant velocity joint, etc.

More particularly, in certain embodiments a linking gear-train comprises three conical convex gears having a common apex at the point of intersection of the first and second axes, a first of such gears having as its axis the second axis and being mounted for rotation with the second element about the second axis, a second of the gears meshing with the first, and being carried by a shaft on an axis passing through the point of intersection of the first and second axes, the shaft being rotatably mounted by bearings in a satellite support plate in turn rotatable about the first axis. The third of the gears meshes with the second gear and has as its axis the first axis. The third gear is carried by a second drive transmission shaft.

In other embodiments, the linking gear-train comprises two conical convex gears having a common apex at the point of intersection of the first and second axes, a first of these gears having as its axis the second axis and being mounted for rotation with the second element about the second axis. The second of the gear meshes with the first and has as its axis the first axis, the second gear being borne by the second drive transmission shaft.

In a still further embodiment, the linking gear-train includes two conical gears having a common apex at the point of intersection of the first and second axes, a first of the gears being convex and having as its axis the second axis, such first gear being mounted for rotation with the second element about said second axis. The second of these gears meshes with the first and is concave. The second gear has as its axis the first axis and is mounted for rotation with the second drive transmission shaft.

In a still further alternative arrangement, drive transmission shafts are respectively rotatably linked to the angular velocity of the first element about the first axis, the angular velocity of the second element about the second axis, and the angular velocity of nutation of the second axis about said first axis, rotational coupling means being provided between at least two of the shafts.

Such coupling means should be understood in the broadest possible sense of the term. They may comprise, in particular, gear-trains or any other appropriate means enabling the velocities to be linked in a fixed or variable ratio.

These coupling means have particular advantages in the effective deployment of the gyroscopic force couple. As is well known, the gyroscopic couple varies as a function of the angle a and the velocities of the second element about the second axis, and the second axis about the first axis. Consequently, the coupling means enable the evolution of the gyroscopic couple to be modified as a function of the output velocity, thus making it possible to obtain available output couples which are better adapted to different uses (constant couple, constant power, etc.).

In order to permit continuous variation of the ratio of change of the output velocities relative to the input velocities, the transmission device also comprises a means to move the rolling surfaces of at least one of the two pairs axially relative to one another. Operation of this means is simplified because the angle of inclination a of the second axis relative to the first axis is substantially constant and equal to the apex half-angle of the conical surfaces.

In a particular variant, in order to make construction of this means simpler, the first element comprises two parts axially movable relative to each other and on which the two rolling surfaces of the first element are formed, the two parts of the first element being mounted in slidable fashion in a support casing having as its axis said first axis. The means for varying the relative axial position of the two reaction surfaces of the first element comprises a rod parallel to the first axis, such rod having two indentical portions of opposite thread and being rotatable about its axis by a control member. This embodiment is particularly suitable when the first element is rotatable about the first axis and is rotatably linked to a third drive transmission shaft. In this case, it is sufficient to link a support casing in rotational manner with the third shaft. Advantageously, the control means effecting axial displacement of the rolling surfaces of the first element by rotating the rod may be an electric motor.

The invention also contemplates a transmission system comprising at least two transmission devices wherein the transmission devices are coupled in such a way that the resultant of the gryoscopic couples to which the second elements of the transmission devices are subjected is substantially zero. Preferably in this case, three transmissions are mounted in a star shape at intervals of 120° about a general axis of the transmission system, the two movable rolling surfaces of the first elements being common and blocked against rotation on the frame about the said general axis.

In each of the previously mentioned embodiments, at least one of the elements is generally biconical in shape, the respective conical rolling surfaces thus provided on such one element having an apex whose half-angle approximates the angle of inclination of the second axis with respect to the first axis. Due to this arrangement, the angle of inclination of the second axis with respect to the first axis is essentially constant so that the transmission ratio may be varied by movement of the rolling surfaces of the first and second elements axially with respect to each other by sliding them along the generatrix of the cone which is essentially parallel to the corresponding axis of revolution. Nevertheless, it is important in the foregoing embodiments that the second element possess a certain degree of freedom in a direction parallel to the plane containing the first axis and the second axis so that it may be able to pivot against the rolling surface of the first element when it is influenced by the gyroscopic forces.

In a further variation of the invention, the necessity for play in the bearing support for the second element is avoided by employing means for supporting the second element and for fixing the angle of inclination a without any degree of freedom and by employing mechanical means to develop the contact forces by which the respective rolling surfaces are urged into rolling friction engagement and deploying the aforementioned gyroscopic force couple to counterbalance these contact forces. Thus, all of the advantages of the previous embodiments may be retained but with a greatly simplified and more durable bearing system.

As mentioned above, the deployment of the gyroscopic force couple, particularly the effective direction thereof, is accounted for by calculation of the structural and kinematic parameters of the second element. The mechanical system to develop the force necessary to retain the rolling surfaces of the respective first and second elements in frictional contact may take a variety of forms. Generally, such systems are predicated on the ability of relative axial movement of the points of rolling surface contact between the first and second elements and develop a radial force component as a result of the relative axial movement.

It will be appreciated that axial positioning of the points of rolling surface contact may be achieved by (1) actuating the rolling surfaces of the second element, (2) actuating the rolling surfaces of the first element or (3) actuating the rolling surfaces of both elements simultaneously. Such actuation, in turn, may be achieved in several ways, for example:

(a) The mechanical system may be an inertial system, particularly of a type comparable to the gyroscopic means described above. In this case, the geometry of annular rings defining the rolling surfaces on the second element and movable with respect thereto and the profile of the rolling surfaces of the first element are fitted in such a manner as to create two axial forces which are capable of actuating the rolling surfaces of the second element towards the rolling surfaces of the first element with an intensity that is sufficient to exert the specific contact pressure necessary.

(b) The mechanical system may be composed of two elastic systems in which case, the contact pressure created by the elastic system is independent of operational conditions during transient ranges.

(c) The mechanical system may be also composed of a systems of ramps forming part of a shaft that is coaxial with the element considered and works together with the complementary ramps of the rolling surfaces of this element. In this case, these ramps may be helicoidal.

Several embodiments of the invention are described below, by way of example, and with reference to the accompanying drawings, in which like parts are designated by like reference numerals.

DETAILED DESCRIPTION OF THE PREFERRED EMBODIMENTS

Figure 1:
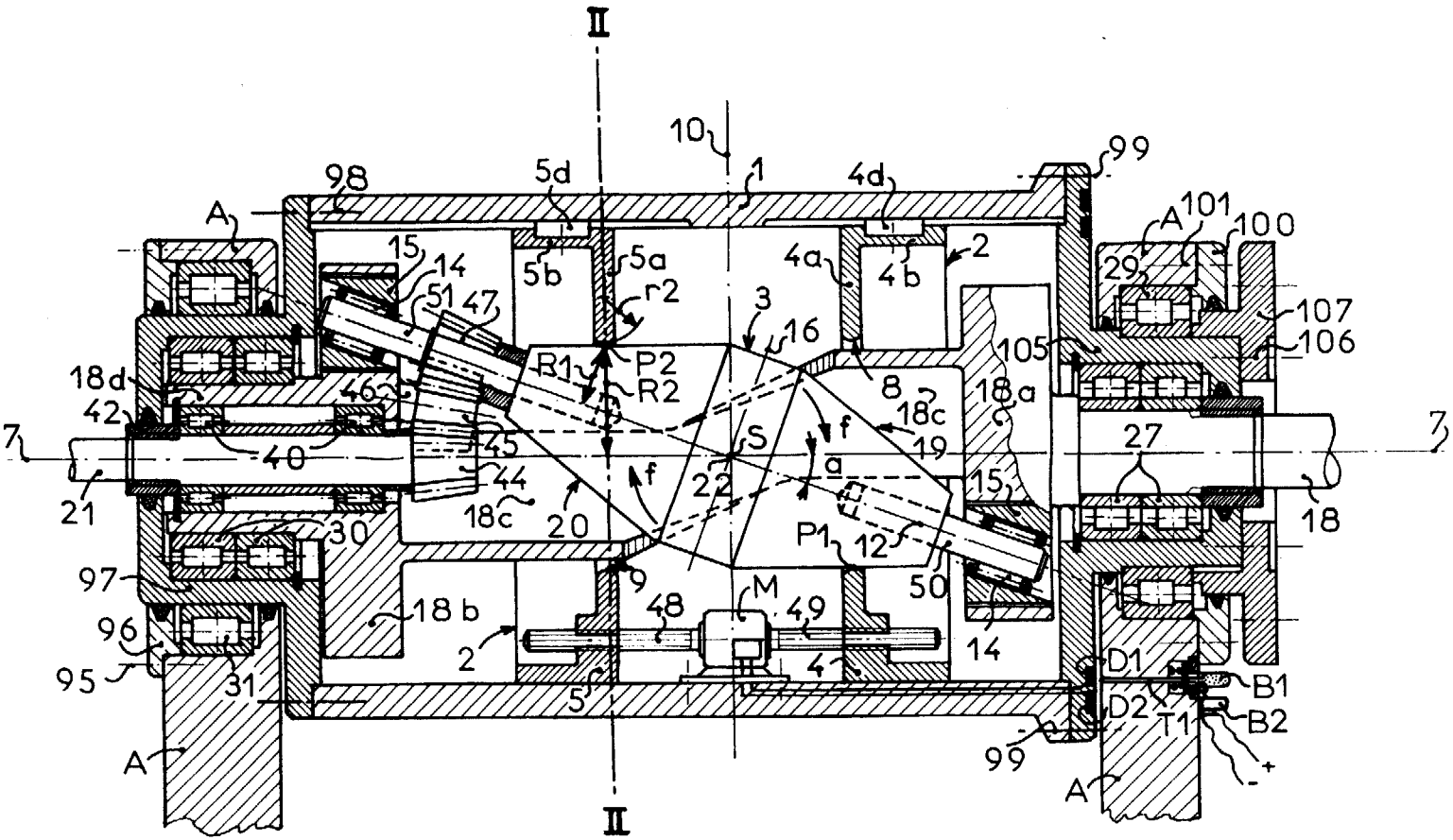
FIG. 1 is an axial section of a first embodiment of a transmission device according to the invention.
Figure 2:
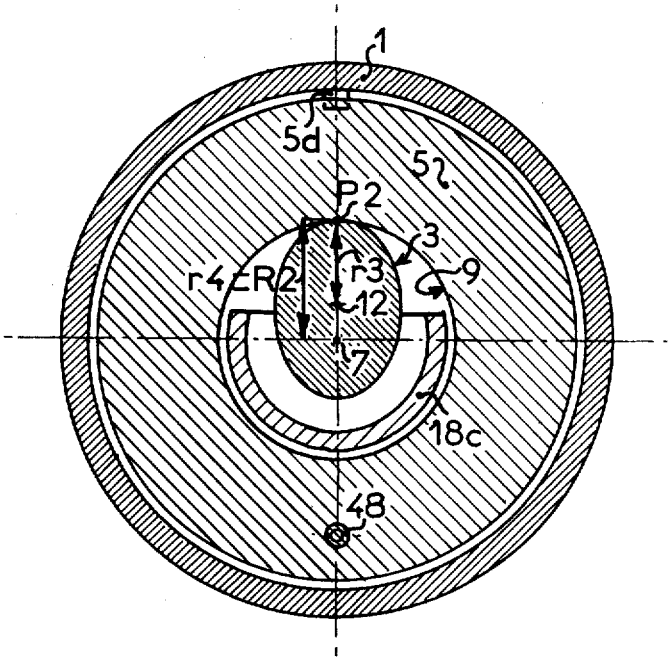
FIG. 2 is a transverse section on the line II—II in FIG. 1.
Figure 7:
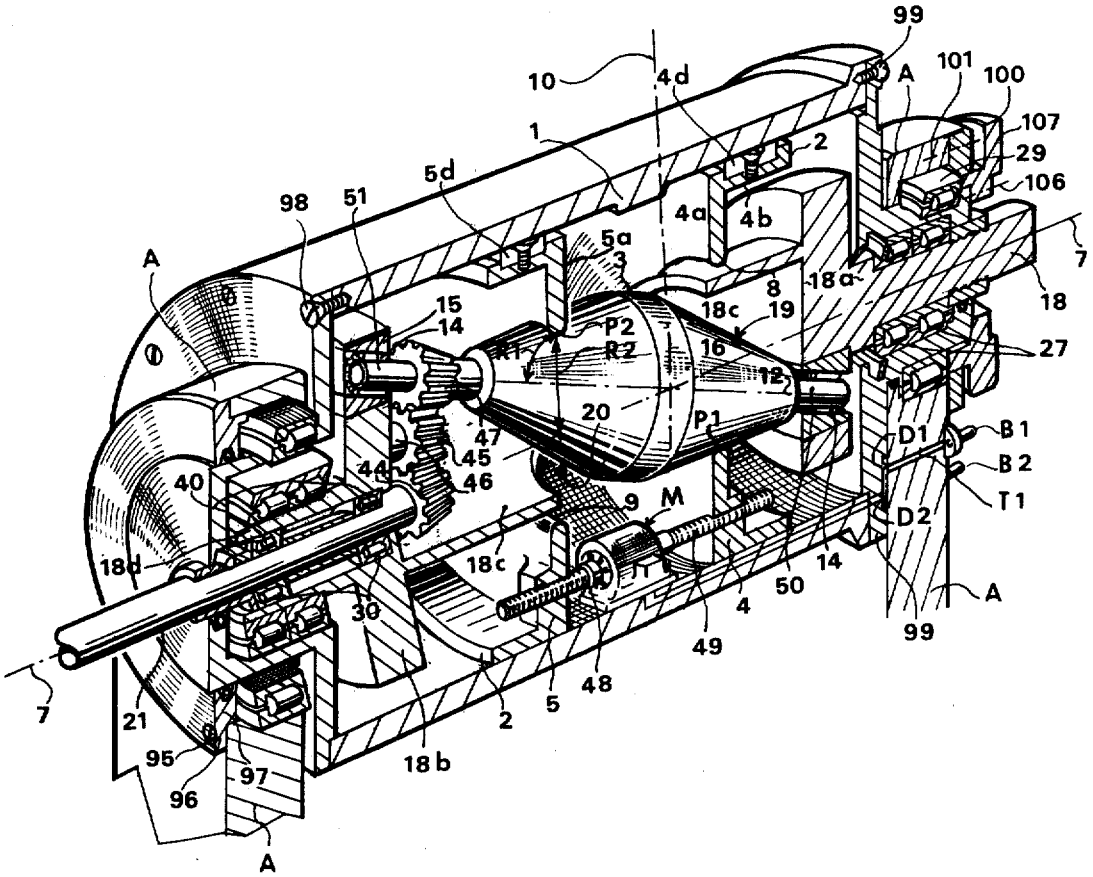
FIG. 7 is a persepective view of the transmission device shown in FIGS. 1 and 2.

The device according to the invention shown in FIGS. 1, 2 and 7 comprises a second element 3 having two conical convex surfaces 19, 20, r 1 ($=\infty$) and r 3 designating the radii of curvature of the surface considered in a meridian plane passing through second axis 12 and in a transverse plane orthogonal to the first, respectively, disposed about second axis 12. These two conical surfaces 19, 20 are both symmetrical relative to a point S located on the second axis 12. Each of these conical surfaces 19, 20 is in frictional contact with a respective one of two annular concave rolling surfaces 8, 9, being of convex toric section in the peripheral direction, r 2 and r 4 designating the radii of curvature of the surface considered in a meridian plane passing through a first axis 7 and in a plane orthogonal to the first, respectively. These surfaces are formed on two parts 4, 5 respectively of a first element 2; the two surfaces 8, 9 are disposed about a first axis 7 and are both symmetrical relative to the point S also located on the first axis 7. The conical surface 19 of the element 3 and the surface 8 of the element 2 make contact at a single point P1 located on the surface 19. The conical surface 20 of the element 3 and the surface 9 of the element 2 make contact at a single point P2 located on surface 20. These two points of contact (P1, P2) are symmetrically disposed relative to the point S. The axes 12 and 7 which intersect at the point S are inclined relative to each other at an angle a.

The second element 3 is drawn in a movement defining a cone with axis 7 and with an angle 2a at the apex S, under the influence of a first shaft 18 coaxial with the axis 7. For this purpose, the shaft 18 pivots about the axis 7 in the casing 1, 97, 105, 107 via bearings 27 and 30 and includes two plates 18a and 18b having an axis coaxial with the axis 7, the plates being connected to each other by a truncated cylindrical portion 18c passing round the element 3. The two plates 18a and 18b support two half-shafts 50 and 51 respectively, coaxial with axis 12 and mounted for rotation with the element 3. These half-shafts 50 and 51 are mounted in the plates 18a and 18b via bearings 14, for example, needle bearings. The bearings 14 consequently permit the second element 3 to rotate freely about axis 12 while being drawn into conical rotation by the plates 18a and 18b.

The external cages of the bearings 14 include sleeves 15 mounted in the plates 18a, with play in the plane containing the axes 7 and 12 and in a direction perpendicular to the axis 12. This gives the element 3 a degree of freedom enabling it to pivot about the axis 22 passing through S and perpendicular to the rotating plane of the axes 7 and 12, under the effect of the gyroscopic couple about axis 22 (in the direction of the arrow f) to which the element 3 is subjected owing to its nutational or conical movement. This causes surfaces 19 and 20 of the element 3 to contact, at points P1 and P2 respectively, surfaces 8, 9 of the element 2. The two surfaces 8, 9 of the element 2 are formed, respectively, on radial portions 4a, 5b, of the two parts 4, 5 of the element 2. These two parts 4, 5 of the element 2 are mounted for rotation about the axis 7, by means of keys 4d, 5d with an element 1, forming a cylindrical casing with axis 7, which is secured on one side at 98 to a lid 97 and on the other side at 99 to a hollow shaft 105, or third shaft, secured at 106 to a flange 107, having axis 7.

The casing rotates freely about the axis 7, in the frame A via bearings 29 and 31, and about the shaft 18 and hollow cylindrical extension 18d of the plate 18b via bearings 27 and 30. The element 3 is rotatably linked to a shaft 21, or a second shaft, with axis 7, via three conical convex gears having a common apex S. The first of these gears, 47, has as its axis the axis 12 and is mounted for rotation with the element 3 about axis 12 by being attached to the half-shaft 51. This gear 47 is moreover drawn by the shaft 51 in the conical movement which the element 3 undergoes about the axis 7. Gear 47 cooperates with a second gear 45 which acts as an intermediary and which is carried by a shaft 46, the axis of which passes through S. This shaft 46 is carried by the plate 18b, and is therefore drawn by the latter about the axis 7 while rotating freely about its axis via bearings housed in the plate 18b. In FIG. 1, the axis of this shaft 46 is not shown. This second gear 45 co-operates with a third gear 44 of the linking gear-train. This third gear 44 has as its axis the axis 7 and is carried on the end of the second shaft 21 to constitute the central planetary arrangement of the linking gear-train. The shaft 21 rotates freely about axis 7 in the cylindrical extension 18d of plate 18b, via bearings 40. The three shafts 18, 21 and 105–107 of the variator may or may not rotate, may or may not be coupled to one another by mechanical connections (gears, etc.), and may each have one of the three functions of input, output or reaction.

The two parts 4, 5 of the element 2 are axially movable relative to one another along the axis 7 and movable symmetrically relative to the plane 10 perpendicular at S to the axis 7. Thus, the points of contact P1, P2 remain symmetrical relative to the point S so that the ratio R1:R2 is always identical at these two points. In this particular case, the casing 1 being rotational about the axis 7, the means used for varying the axial spacing of the parts 4, 5 is an electric micromotor M fixed on the casing 1. Motor M is controlled from outside the casing by push-buttons B1, B2 connected to a source of electric current, and which co-operate via rods T1, T2 with annular conducting tracks D1, D2, with axis 7, formed in the lid 105. These tracks are connected to the motor M by conducting wires passing through the cylindrical wall of the casing 1. The motor M drives a rod, the axis of which is parallel to the axis 7, formed of two threaded parts with an identical but opposite thread at 48 and 49, which co-operates with the two parts 4, 5 of the element 2. Depending on whether B1 or B2 is pressed, the motor M drives the rod 48, 49 in one direction or the other, in order to simultaneously move the two parts 4, 5 of the element 2 away from or towards each other.

FIG. 2 represents a section through FIG. 1 on a plane passing through the point of contact P2 and perpendicular to the meridian plane of the axes 7 and 12 (the line II—II in FIG. 1). This figure shows the radii of curvature r3 and r4 transverse to the point of contact.

Figure 3:
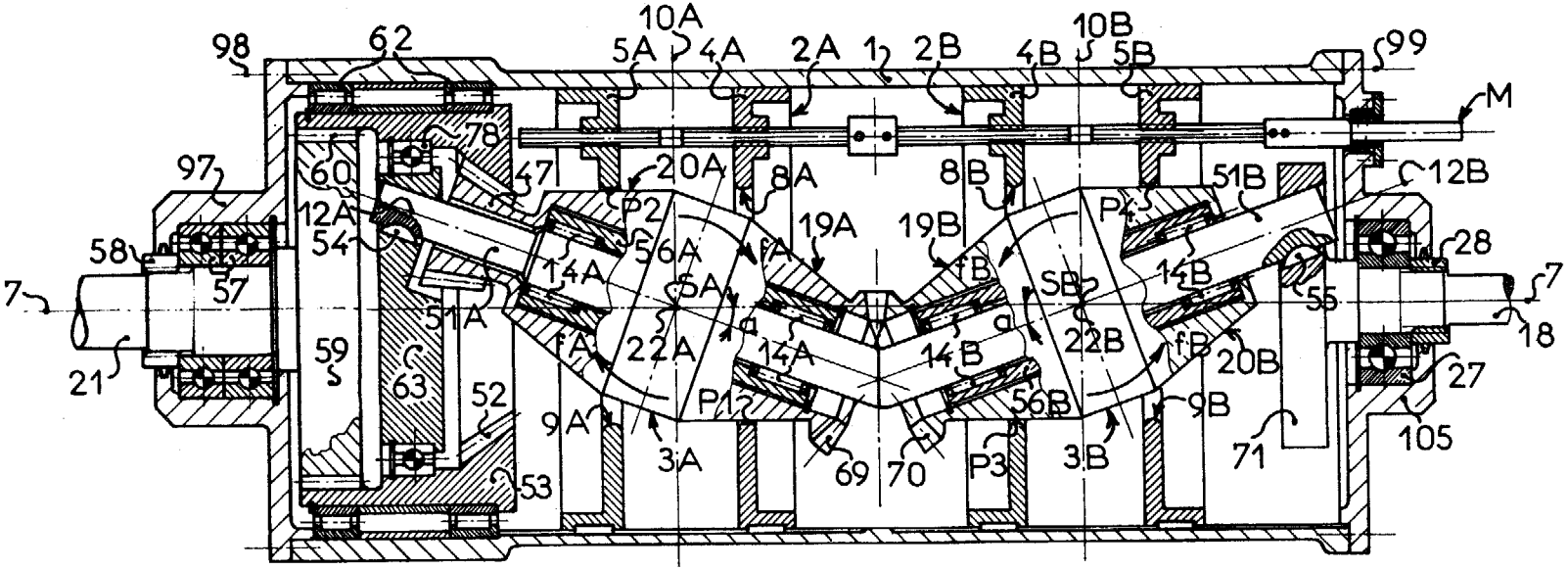
FIG. 3 is an axial section of a second embodiment of a transmission device according to the invention.

FIG. 3 represents a mechanical speed variator which comprises two biconical convex elements 3A and 3B each in contact, at two points P1, P2, and P3, P4 respectively, with two sets of annular surfaces 8A, 9A, and 8B, 9B, formed on the two parts 4A and 4B. The two elements 3A and 3B are mounted opposite each other on the same bent shaft forming a crank-shaft and having two parts 51A and 51B, with axes 12A and 12B inclined at equal but opposite angles a to the axis 7. These elements 3A and 3B are drawn about the axis 7 in conical movement having apices SA and SB with apex angles 2a, by a common shaft 18, or first shaft coaxial with the axis 7. This shaft 18 is pivotably mounted in the casing 1-105 via bearings 27, to form a drive input or output.

For this purpose, the two parts 51B and 51A are carried by two support plates 71 and 63. The plate 71 extends the shaft 18 and receives the end of the shaft 51B, joining it at 55. The plate 63 is freely mounted for rotation about axis 7 via bearings 78 and receives the end of the shaft 51A, joining it at 54. Each element 3A and 3B has a sufficient degree of freedom to pivot about respective axes 22A and 22B passing through points SA and SB and perpendicular to the rotating plane containing the axes 7, 12A and 12B. This degree of freedom is obtained by mounting the bearings 14A and 14B which support the elements 3A and 3B on the shafts 51A and 51B, in outer cages 56A and 56B which are prismatic (e.g. squares) in cross section. These cages 56A and 56B are housed in the elements 3A and 3B with some play in the meridian plane and in the direction perpendicular to the axes 12A and 12B respectively. The gyroscopic couples to which the elements 3A and 3B are subjected (arrows fA and fB) press the element at the points of contact P1, P2, P3, P4, against the annular surfaces of the elements 2A and 2B. These annular surfaces are locked against rotation about axis 7, for they are mounted for rotation with a common casing 1-105-97 which is itself fixed.

By reaction, the elements 3A and 3B rotate about their respective axes 12A, 12B, with identical angular velocity and in the same direction. The two elements 3A and 3B are linked in rotation by conical gears 69 and 70 and rotatably connected to a common shaft 21 (or second shaft) having axis 7 for its axis, which rotates in 97 via bearings 57, to form a drive input or output. The rotational connection between the shaft 21 and the element 3A is effected by two conical gears having a common apex SA, the first 47 being convex, with apex 12A and formed in 3A, the second 53, which co-operates with 47 at 52, being concave, with axis 7 and secured at 60 to the shaft 21 for rotation therewith to form the outer crown of the linking gear-train. This crown 53 is held in the casing 1 by bearings 62.

The surfaces 8A and 9A are symmetrical relative to the plane 10A, and the surfaces 8B and 9B are symmetrical relative to 10B. Since the casing 1 is fixed, the speed variation may be controlled directly from outside, either manually or by electric means or the like. The arrangement with two biconical elements 3A and 3B is used so that the resulting gyroscopic couple on the frame is substantially zero. It should be noted that the four points of contact P1, P2, P3, and P4 all work in parallel, not in series, in power transmission.

Figure 4:
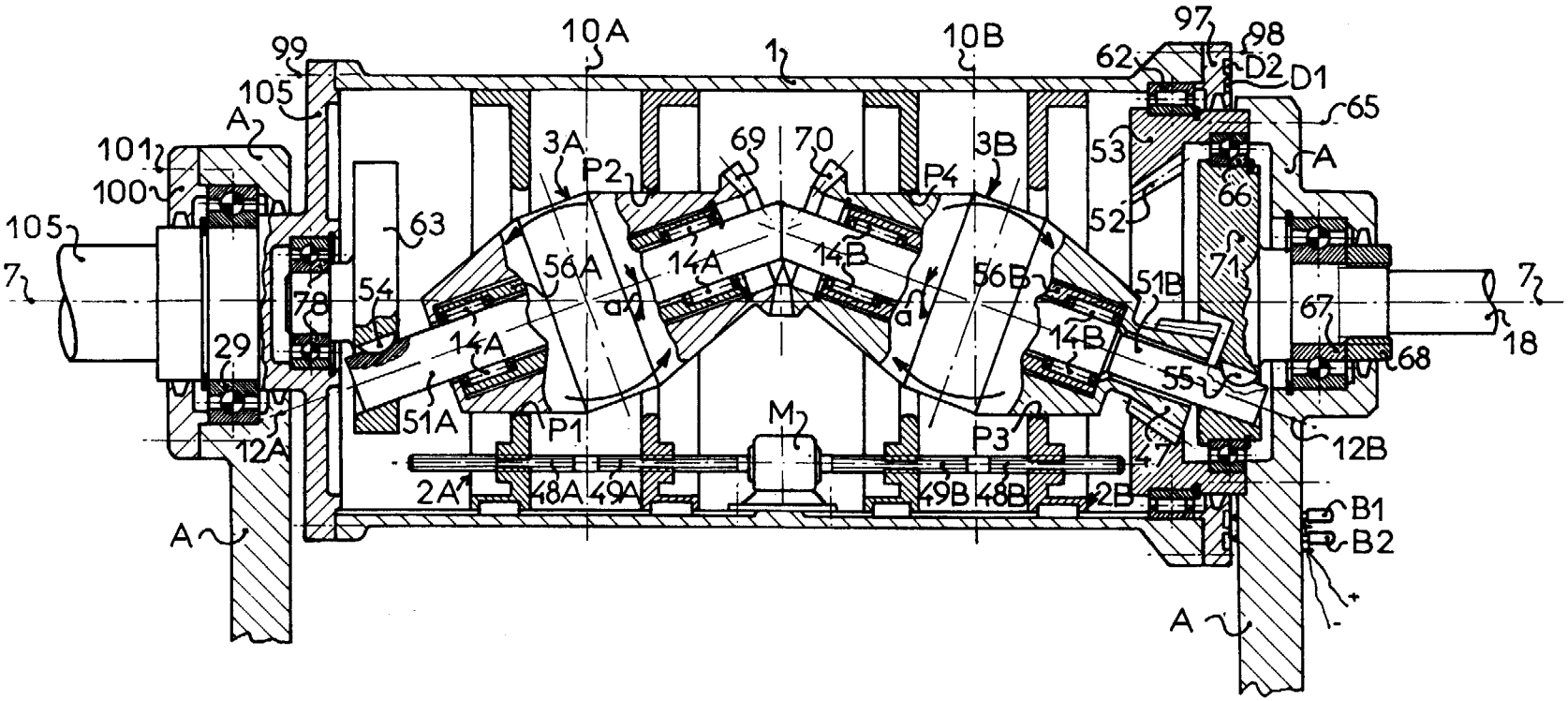
FIG. 4 is an axial section of a third embodiment of a transmission device according to the invention.

FIG. 4 shows a mechanical variator which is different from that in FIG. 3 only in that the second shaft 21 is locked against rotation, being in effect portion 65 of the frame A, while the first shaft 18, mounted in bearings 67, still constitutes an input or output shaft 18 secured to plate 71 which is mounted in bearings 66 carried by the casing. A third shaft 105 mounted in bearing 29 and being an extension of the casing, rotates and constitutes an input or output. Communication of the conical movement by the shaft 18 to the two elements 3A and 3B, the mountings of the elements 3A and 3B providing a degree of pivotal freedom, and the gear-train with two conical gears forming a link with the shaft 21 (i.e. casing portion 65) are equivalent to those described in FIG. 3. Since the casing 1 rotates, the speed variation is controlled by means of a micro-motor M.

Figure 5:
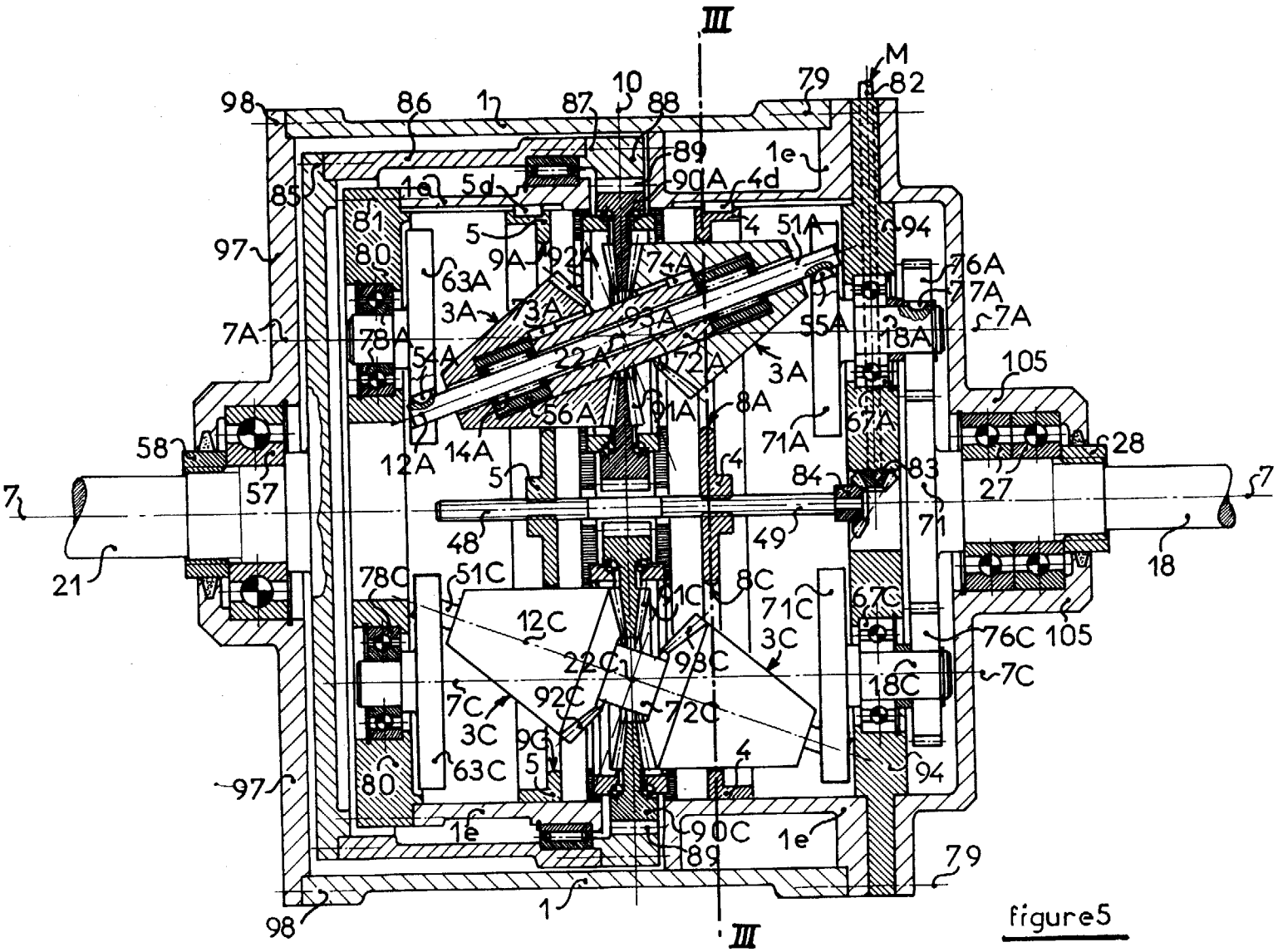
FIG. 5 is an axial section of a fourth, embodiment of a transmission device according to the invention.
Figure 6:
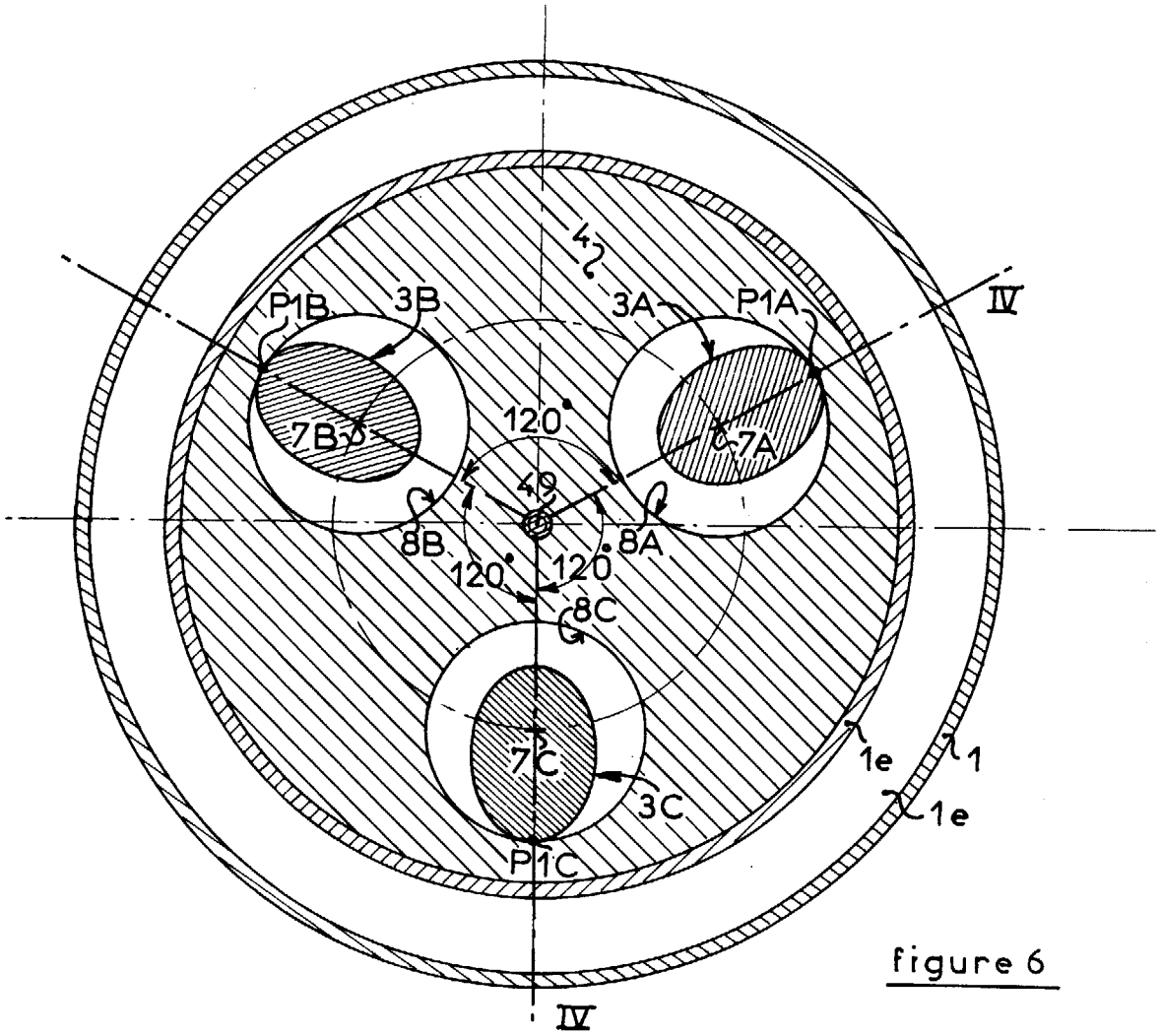
FIG. 6 is a transverse section on the line III—III in FIG. 5.
Figure 8:
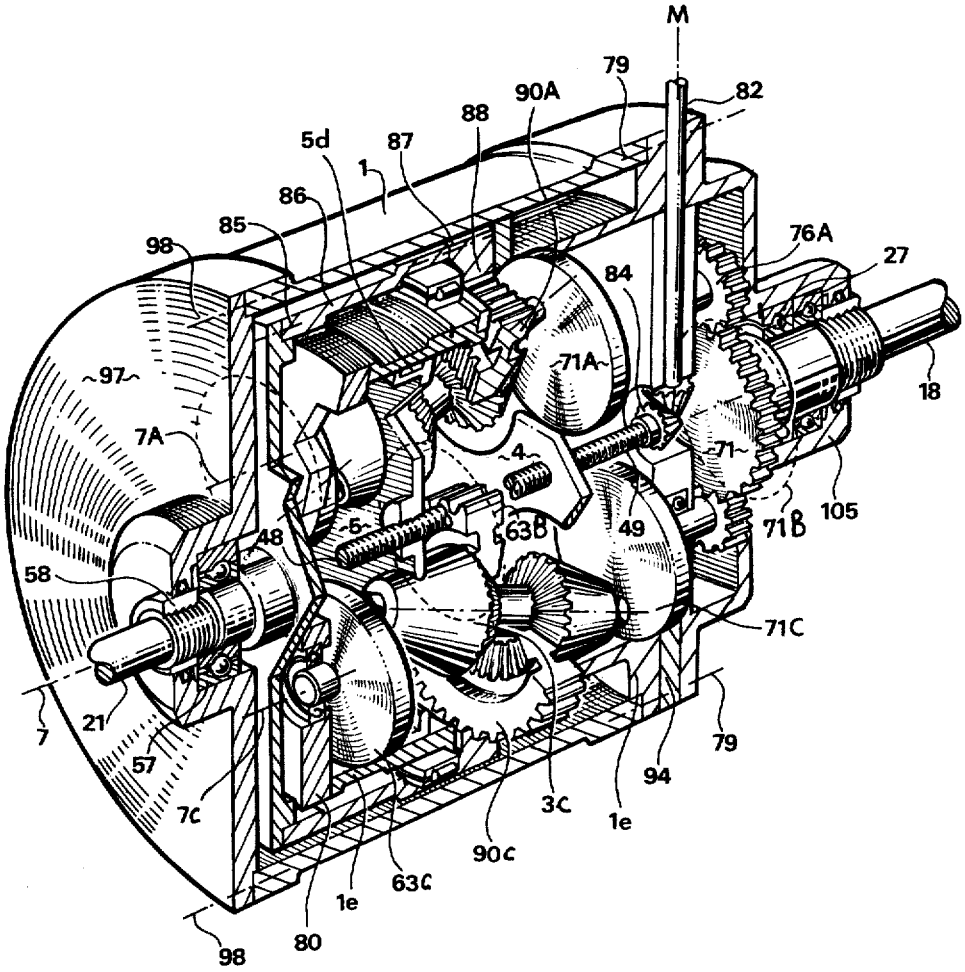
FIG. 8 is a perspective view of the transmission device shown in FIGS. 5 and 6.

FIGS. 5, 6 and 8 show a transmission consisting of 3 biconical elements 3A, 3B 3C mounted in a star shape, spaced by 120° from each other about common general axis 7. Thus the resultant of the 3 gyroscopic couples communicated by the three elements 3A, 3B and 3C to the two common parts 4 and 5 and then from these parts 4 and 5 to the casing 1 is substantially zero. Each of these three elements 3A, 3B, 3C is drawn in a conical movement with an apex angle 2a about its respective axis 7A, 7B, 7C parallel to the general axis 7. For this purpose, each of the elements 3A, 3B, 3C is mounted on a shaft 51A, 51B, 51C inclined to the respective axis 7A, 7B, 7C, each of these shafts being supported by two plates 71A and 63A, 71B and 63B, 71C and 63C, respectively, as in the arrangement in FIGS. 3 and 4.

Each of the elements 3A, 3B, 3C has the necessary degree of freedom for pivoting about the axes 22A, 22B, 22C, since they are mounted on bearings 14A, 14B, 14C in an identical manner to that shown in FIGS. 3 and 4. Each element 3A, 3B, 3C abuts, at a fifth point on the annular, concave, toric surface corresponding thereto, the surfaces being 8A with axis 7A, 8B with axis 7B, and 8C with axis 7C respectively, and at a second point on surface 9A with axis 7A, 9B with axis 7B, and 9C with axis 7C respectively. The three annular surfaces 8A, 8B, 8C are formed by cutouts spaced at 120° intervals, in a common member 4 with axis 7, and the three annular surfaces 9A, 9B, 9C are similarly cut out in a member 5 also with axis 7. Members 4 and 5 are secured at 4d and 5d to an intermediate cylindrical casing 1e, with axis 7, for rotation therewith about axis 7, this casing in turn being secured at 79 to a general casing 1-97-105 also with axis 7.

In this arrangement, the casing 1-105 is locked against rotation about the axis 7, and thus the two parts 4 and 5 are also locked against rotation about this axis, although being axially movable relative to the axis 7 and remaining symmetrical relative to the plane 10, for the purpose of speed variation. Independent plates 63A, 63B, and 63C are freely mounted for rotation about their respective axes via bearings 78A, 78B, 78C, carried by a fixed support plate 80 with axis 7 and fixed at 81 to the intermediate casing 1e. The plates 71A, 71B, 71C are mounted in bearings 67A, 67B, 67C on a fixed support plate 94 with axis 7, fixed at 79 to the casing 1. The three shafts 18A, 18B, 18C of these plates 71 rotate at the same speed and in the same direction about their respective axes 7A, 7B, 7C, by being rotatably linked by gears 76A, 76B, 76C to a gear 71 provided on the shaft 18, which constitutes an input or output in this arrangement. This shaft 18 is rotatably mounted in the casing 1-105 by means of bearings 27.

By reaction, at six points of contact on the six annular surfaces 8A, 9A, 8B, 9B, 8C, 9C, the three elements 3A, 3B, 3C rotate about their respective axes 12A, 12B, 12C at the same speed and in the same direction. Each of these three elements 3A, 3B, 3C is linked in rotation to common shaft 21 with axis 7, which is rotatably mounted in the casing 97-1-105 by means of bearings 57. This rotational linking is provided by conical gears 91A, 91B and 91C having apices SA, SB, SC and axes 7A, 7B, 7C, respectively, carried by annular pieces 90A, 90B, 90C with axes 7A, 7B, 7C respectively. Three gears 91A, 91B and 91C co-operate with conical gear teeth 93A, 93B, 93C having apices SA, SB, SC and axes 12A, 12B, 12C respectively, which are formed in the two conical halves of each of the elements 3A, 3B, 3C.

The annular pieces 90A, 90B and 90C co-operate via gears on their periphery with gear teeth 89 of a crown 88 with axis 7, said crown being mounted for rotation about axis 7 with the shaft 21, via sections 87, 86 and 85. It should be noted that the six points of frictional contact of this arrangement all work in parallel, and not in series in power transmission.

FIG. 6 represents a section through the transmission device in FIG. 5, on a plane perpendicular to the axis 7 and passing through three of the points of contact (line III—III in FIG. 5) FIG. 5 is a biradial section on the line IV—IV in FIG. 6.

In each of the embodiments thus described, the rolling surfaces of the first and second elements are pressed against each other solely by the aforementioned gyroscopic force couple with sufficient force to enable the transmission of constant high power without need for additionally supporting the rolling surfaces and without producing axial reaction forces.

Figure 9:
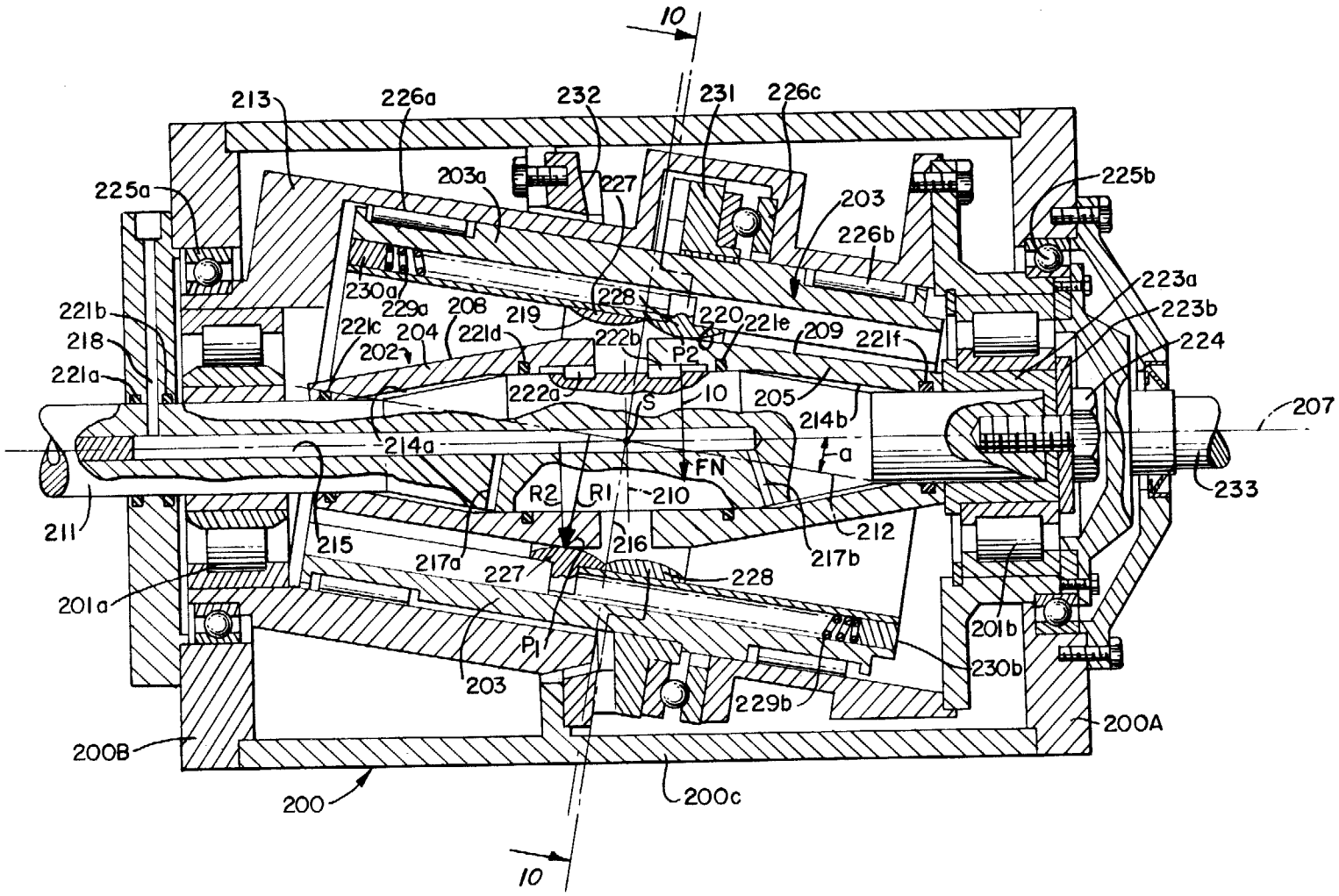
FIG. 9 is a longitudinal section, cut by a plane passing through the first and second axes, of another alternative embodiment of the invention.
Figure 10:
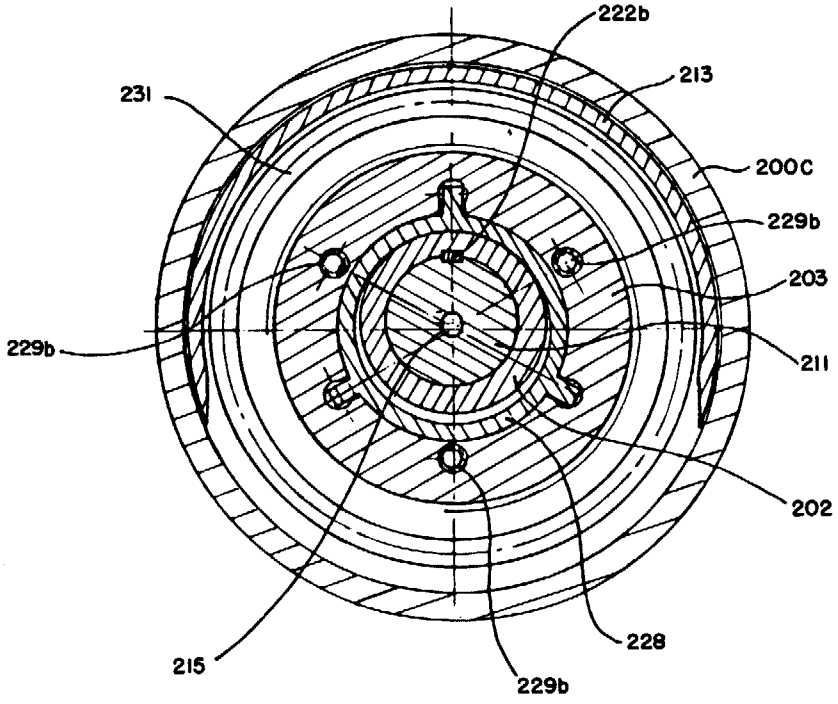
FIG. 10 is a cross-section on line 10—10 of FIG. 9.

FIGS. 9 and 10 show a longitudinal view and a cross-sectional view, respectively, of an alternative embodiment of the invention and in which the gyroscopic force couple previously described is deployed to counterbalance a mechanically developed force for frictional rolling engagement of the elements of the transmission. This transmission includes a fixed frame 200 composed of two essentially flat sides 200A and 200B at the end of the frame joined by a crankcase 200C of an approximately cylindrical shape. The frame thus constituted supports a first element 202 and a second element 203.

The first element 202 is rotatable around a first axis 207, which is the longitudinal axis of the transmission and is fixed with respect to frame 200. The first element is composed of two half-sections 204 and 205 defining two conically shaped rolling surfaces 208 and 209. The two half-sections are mounted on a shaft 211 (output shaft) which is coaxial with the first axis 207 and are axially movable with respect to each other in the longitudinal direction of the first axis 207. Keys 222a and 222b lock the two half-sections 204 *and 205* and the shaft 211.

Two annular chambers 214a and 214b are disposed between the interior of the half-sections 204 and 205, respectively and the exterior surface of shaft 211. These annular chambers are connected through ducts 217a, 217b and 215 in the shaft 211 with a cylindrical throat 218 at the surface of shaft 211 and through which a liquid under pressure may be passed to the chambers 214a and 214b during rotation of the shaft 211 about the first axis 207. Running seals 221a, 221b, 221c, 221d, 221e and 221f isolate the system of annular chambers and of the supply ducts to these annular chambers. Introduction of a fluid under pressure into the annular chambers 214 will simultaneously displace the two half-sections 204 and 205 and associated rolling surfaces 208 and 209 axially by separating them. The function of this movement of the surfaces 208 and 209 of the first element 202 will be described in more detail below.

The rolling surfaces 208 and 209, which have the shape of truncated cones, rotate about the first axis 207. They are symmetrically arranged with respect to a plane 210 perpendicular to the first axis 207 at a point S on this axis. The larger ends of *the* bases of these two truncated cones face each other.

The shaft 211 is supported by the frame 200 at each of its ends by a system of bearings that include a first series of roller bearings 201a and 201b which are coaxial with the first axis 207. In order to facilitate mounting of the first element 202 on the shaft 211, the end of shaft 211 is provided with a system of washers 223a and 223b and bolt 224.

A support 213 is mounted so that it can rotate about the first axis 207 by a system of bearings 225a and 225b which are inserted between the frame sides 200A and 200B and support 213. The aforementioned bearings 201a and 201b are themselves mounted inside support 213 in the transverse plane of the bearings 225a and 225b at each end of the transmission so that the first element 202 may rotate with respect to the support 213 which can itself rotate with respect to the frame 200. The support 213 is essentially cylindrical and is inclined with respect to longitudinal axis 207 of the transmission. Also the support 213 carries the second element 203 by way of [ball] *roller* bearings 226a[,] *and* 226b *and a ball bearing* 226c. The [last of these bearings] *ball bearing 226c* functions to position the second element 203 axially with respect to the support 213. *Also the inner races of the roller bearings 226a and 226b define journal surfaces on the second element 203 which are surfaces of revolution about the second axis 212.*

The second element 203 is a solid of revolution having an essentially cylindrical shape and is rotatable with respect to support 213 about a second axis 212 which passes through the point S of the first axis 207 and is inclined at a constant angle a with respect to the latter. In this embodiment of the invention the apical half-angle of the truncated cones defining the rolling surfaces 208 and 209 of the first element 202 is slightly smaller than the aforementioned angle of inclination a. The reason for this feature will become apparent from the description of the operation of this transmission to follow below.

The second element 203 includes two rolling surfaces 219 and 220 which [rotate] *are surfaces of revolution* about the second axis 212 and are symmetrically arranged with respect to a plane 216 that is perpendicular to the second axis 212 at point S. The rolling surfaces 219 and 220 are formed on two annular rings 227 and 228 which are mounted in the second element 203 to move axially with respect to each other in the longitudinal direction of the second axis 212 but rotate together with the second element 203.

A mechanical system of several compression springs 229 moves the two rolling surfaces 219 and 220 of the second element 203 axially in such a way as to press them with force at two contact points $P_1$ and $P_2$ against reaction surfaces 208 and 209 of the first element 202. These springs are mounted along the internal wall of the second element 203 and abut at one end on plugs 230a and 230b mounted at the two end extremities of the second element 203. At the other ends the [the] springs engage the annular rings [229] *227* and 228 to bias them in *a* direction away from the plane 216.

A conical gear 231 with an apex intersecting the point S is mounted so that it will rotate together with the second element 203. It meshes with a conical gear 232, also with an apex at S and which is attached to the crankcase 200C of the frame. The biconical rolling surfaces 208 and 209 make rolling frictional contact at $P_1$ and $P_2$ with the rolling surfaces 219 and 220 of the second element. The specific contact pressure is created by the system of springs 229. These springs 229 and the apical half-angle of the truncated cone surfaces are calculated to create a normal force $F_N$ that is sufficient to transmit the input torque from the second element 203 to the first element 202 without having the rolling surfaces slip with respect to each other. Due to rotation of the input shaft 233, the surfaces 219 and 220 will be set into rotational motion about the second axis 212 at a velocity Wb* as well as in conical motion with an apex at S, around the first axis 207 at a velocity Wa. The velocities [Wb] *Wb, Wa and the velocity W of the first element around axis 207** are related by a kinematic equation which depends on the geometry of the bearing tracks. This equation is the following:

$$W - Wa - Wb^*(R_1/R_2) = 0$$

In this equation, $R_1$ represents the radius of the circle described by one of the contact points on the rolling surface associated with the second element while $R_2$ represents the radius of the circle described by one of the contact points on the rolling surface associated with the first element.

In the case of this embodiment, the conical gears 231 and 232 of apex S, which are attached to the second element 203 and to the frame, act to control the rotational velocities Wa and Wb so that these maintain a constant ratio. As a result, for a given input velocity Wa, there is only one output velocity W at which the output shaft 211 of the transmission will be driven.

The weight of the second element 203 is distributed [is] *in* such a way that the center of gravity of the second element coincides with the point of intersection S of the first and second axes and so that the principal moments of inertia of the second element have values that are appropriate to velocities Wa and Wb and to the angle of inclination a to develop a gyroscopic couple having a direction and magnitude sufficient to totally or partially balance the reaction couple associated with the normal forces $F_N$. As a result, the bearings 226a, 226b and 226c, which support the second element 203, are subjected to zero forces or to relatively small forces during operation. Also as a result of the symmetrical arrangement of the rolling surfaces, the bearings 201a, 201b, 225a and 225b, which support the transmission gear shafts are not subjected to any axial reaction forces.

It is possible to vary the ratio of input and output speeds by modifying the ratio $R_1/R_2$. By injecting a fluid under pressure into chambers 214a and 214b, it is possible to displace the rolling surfaces 208 and 209, respectively, by separating them from plane 210. In FIG. 9, the rolling surfaces 208 and 209 are shown in their position of maximum displacement. The transverse spacing that is available between rolling surfaces 208 and 209 and the cylindrical inner surface of the element 203 decreases as these reaction surfaces are displaced from each other. Also, because the angle of inclination of the second axis with respect to the first axis is slightly greater than the apex half-angle of bearing tracks 208 and 209, which have the shape of a truncated cone, the transverse or radial spacing that is available between rolling surfaces 208 and 209 and cylindrical inner surface of the second element 203 increases in the direction of the plane of symmetry 216. Consequently, the annular rings 227 and 228, which are axially movable and on which are formed the rolling surfaces 219 and 220, can only recoil against the bias of the springs 229a and 229b in the direction of the plane 216 when the conical surfaces 208 and 209 are separated from each other by fluid under pressure. As a result, the ratio $R_1/R_2$ varies since the radius $R_2$ increases. As a result, and taking into account the aforementioned kinematic equation, the ratio of velocities W and Wa varies.

Conversely, when the fluid pressure in chambers 214a and 214b is reduced, the conical surfaces 208 and 209 move closer to each other and to plane 210. In fact, they are actuated by the spring system 229a and 229b by way of the annular rings 227 and 228. They are actuated by the system of springs as long as the fluid pressure in the chambers does not balance the force exerted by the elastic system. As a result of this reversible displacement of the conical reaction surfaces 208 and 209, the ratio of transmission speeds may be continuously varied in one direction or the other.

Figure 11:
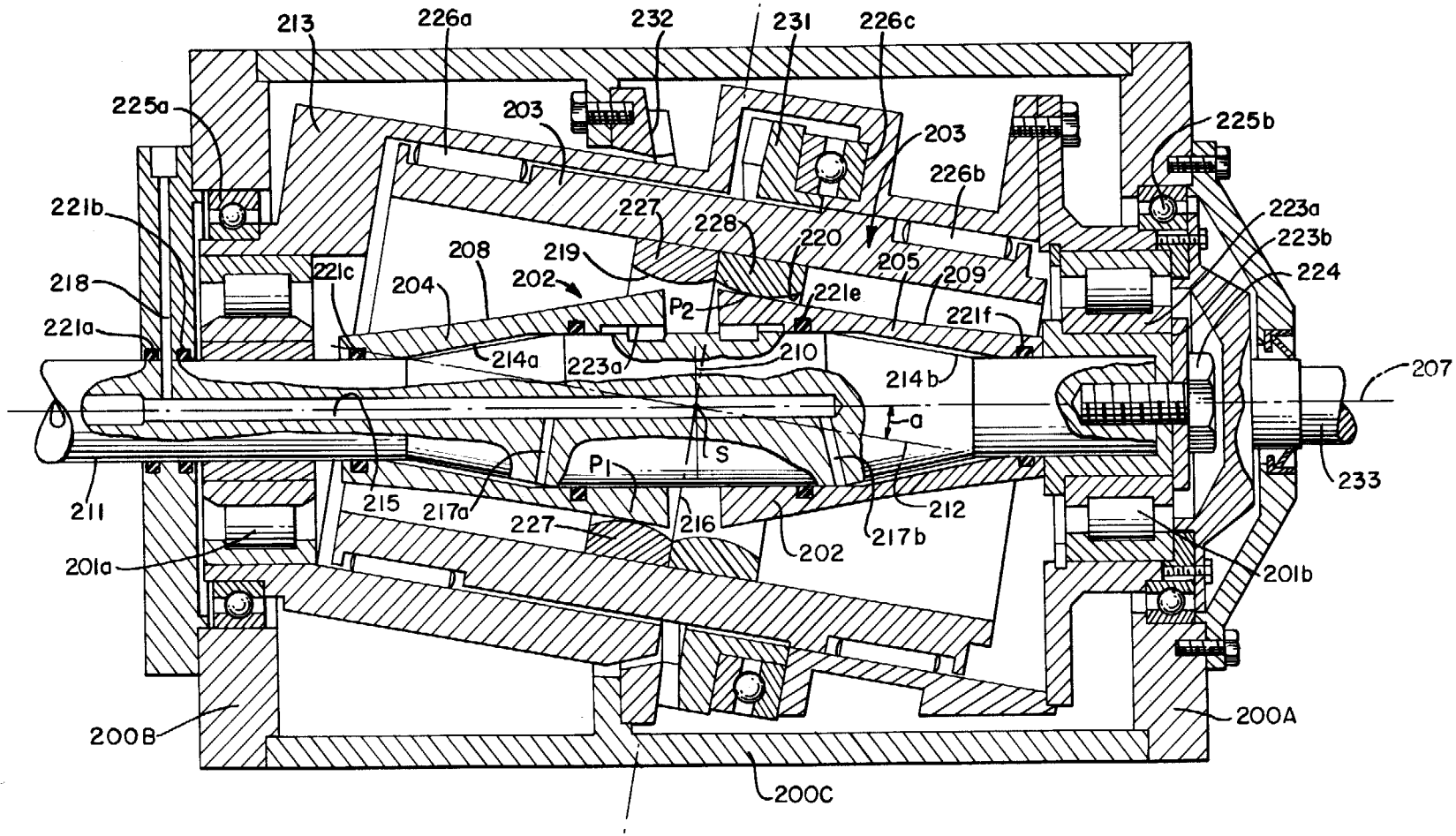
FIG. 11 is a longitudinal section, cut by a plane passing through the first and second axes, of a further embodiment like that of FIG. 9 but with an inertial mechanical system.

In FIG. 11, a variation of the previous embodiment is shown and in which an inertial system is substituted for the spring system described above. In this figure, most of the components described in FIG. 9 are retained. In particular, the frame 200, the first element 202, the second element 203, the first axis 207, the second axis 212, the support 213, the rolling surfaces 208 and 209 of the first element, the rolling surfaces 219 and 220 of the second element as well as the constant angle of inclination a of the second axis with respect to the first axis are retained. Thus, only the components which have a structure that is different from that previously described will be considered.

Figure 12:
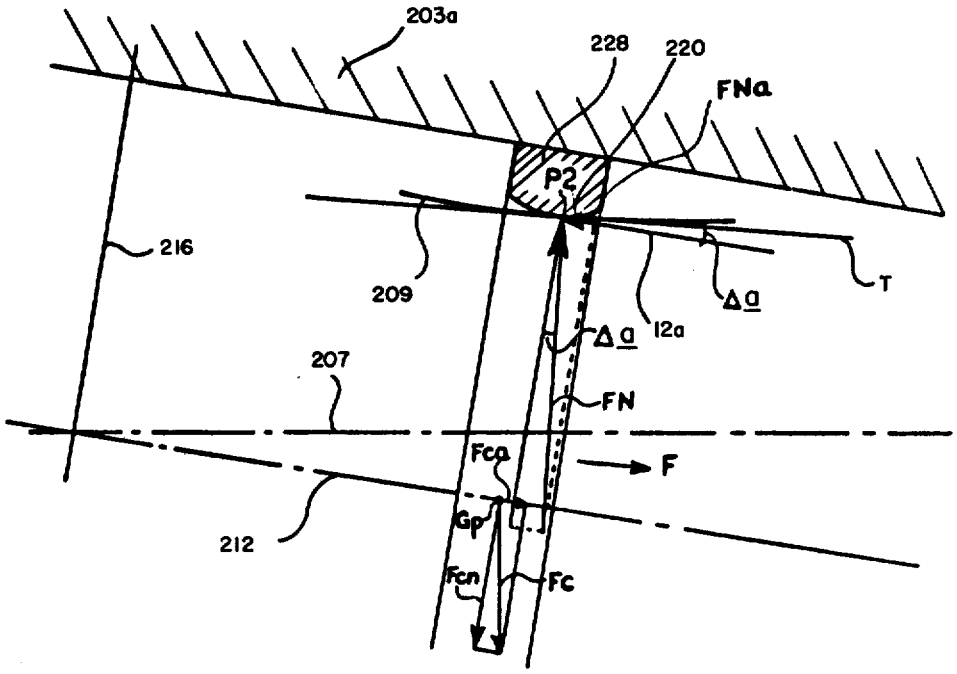
FIG. 12 is a force diagram illustrating operation of the inertial mechanical system illustrated in FIG. 11.

In the variation of FIG. 11, the mechanism employed to axially adjust the respective reaction surfaces is inertial in character, i.e., the inertial forces developed by the mass of annular rings 227 and 228 force them against rolling surfaces 208 and 209. FIG. 12 is a diagram of the forces illustrating operation of the mechanical system applicable to one of the rings. Since the annular ring 228 is driven at a rotational velocity Wa around the first axis 207, it is subjected to centrifugal forces having a resultant at $G_P$ (center of gravity of the annular ring located at the second axis 212) which is a rotational force $F_c$.

(This force depends on the geometry and mass of the annular ring as well as on the velocity Wa). This force may be separated into an axial component $F_{ca}$ which is directed along the second axis 212 and a radial component $F_{cn}$. The axial component $F_{ca}$ acts in a direction to displace the annular ring 228 in the direction of the arrow f, i.e., it tends to displace ring 228 from the plane of symmetry 216 of the second element. Because of this, the surface 220 on annular ring 228 will move axially until it engages the rolling surface 209 of the first element and so that these surfaces roll together without slipping. In order to transmit a given input couple, it is necessary to exert a certain normal force $F_N$ which may be calculated or determined experimentally from the value of the couple to be transmitted.

The meridianal profile of the annular ring 228 may be designed with a slight curvature so that at each contact point between surfaces 209 and 220, the normal force created by centrifugal force $F_c$ shall be equal to the normal force $F_N$ desired. Specifically, if T designates the tangent to the contact point $P_2$ of the motion surface 209 of the first element this tangent T makes an angle Δa with the second axis 212 as depicted in FIG. 12 by the two lines passing through $P_2$ that are respectively parallel and perpendicular to the second axis 212.

The axial component $F_{Na}$ along the second axis 212 of the normal force $F_N$ is a function of the abovementioned angle Δa as follows:

$$F_{Na} = F_N \times \sin \Delta a$$

At equilibrium, this axial component $F_{Na}$ must be equal to the axial component $F_{ca}$ which is created by centrifugal force, or:

$$F_{ca} = F_{Na} = F_N \times \sin \Delta a$$

By solving this equation graphically or numerically, therefore, it is possible to determine the geometry, the mass of the annular ring and the rotational velocity thereof Wa, as well as the profile for rolling surface 209 which will develop the desired normal force $F_N$.

Operation of the fluid system which axially positions the surfaces 208 and 209 for variation of the transmission speed is identical to that described with reference to FIG. 9.

Figure 13:
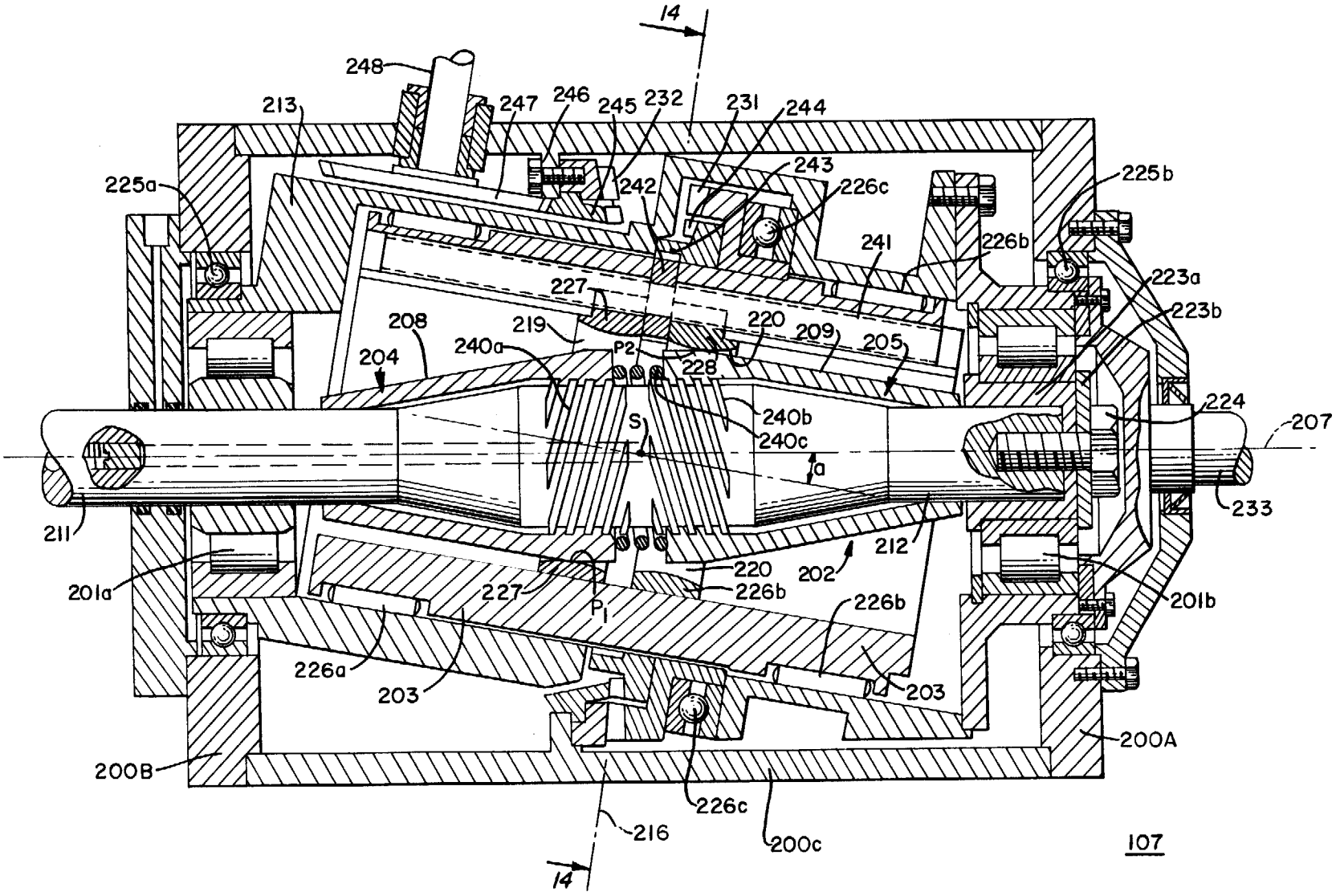
FIG. 13 is a longitudinal section, cut by a plane passing through the first and second axes, of a still further constructional variation comprising a mechanical system composed of a system of helical ramps.
Figure 14:
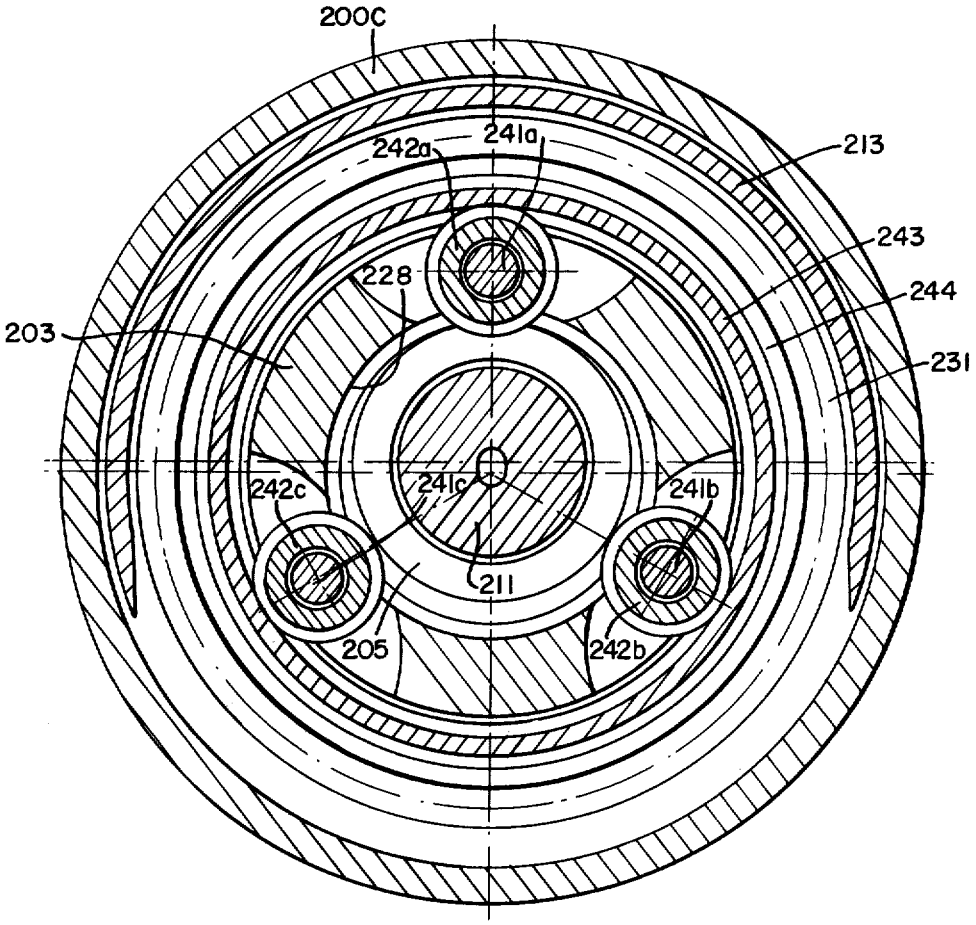
FIG. 14 is a cross-section on line 14—14 of FIG. 13.

In FIGS. 13 and 14, a further constructional variation of a mechanical system for rolling surface engagement is shown. Again, most of the components described with reference to FIG. 9 are shown and bear the same reference characters.

In this constructional variation, the rolling surfaces 208 and 209 are truncated cones whose apical half-angle is equal to the angle of inclination a of the second axis with respect to the first axis. As a result, the annular space available between the cylindrical inner surface of the second element 203 and the rolling surfaces 208 and 209 is constant over the entire length of the surfaces.

The annular rings 227 and 228 are mounted in such a way as to permit them to be displaced axially in the direction of the second axis in the aforementioned annular space and make frictional contact with the rolling surfaces 208 and 209 which are movable on shaft 211 by means of helicoidal ramps 240a and 240b of opposite slope. Thus, by turning the two half-sections 204 and 205 with respect to output shaft 211 in the proper direction, the ramps will separate the two half-sections 204 and 205. The effect of such separation is a reduction in the annular space between the rolling surface 208 and 209 and the second element 203. Therefore, by turning the two half-sections 204 and 205 in the proper direction relative to the ramps, the rolling surfaces 208 and 209 are advanced against surfaces 219 and 220 with a normal force sufficiently large to transmit the input torque of the transmission. A bolt lock spring 240c is inserted between the two half-sections 204 and 205 to facilitate such relative rotation of the sections 204 and 205 relative to the ramps by preloading the reaction surfaces so as to prevent slipping with respect to each other during the starting period.

The annular rings 227 and 228 are mounted so that they slide axially within the second element 203 which has a cylindrical interior shape. They are traversed by threaded rods 241, similar to 241a, 241b and 241c, which have a reverse thread and which effect displacement of the rings (to separate them or to bring them closer) in an axial direction. The threaded rods 241 are joined to gears 242, similar to 242a, 242b and 242c by a toothed wheel 243 whose axis is the same as axis 212. The toothed wheel 243 is connected to a conical gear 244 of apex S that is engaged to another conical gear 245 of apex S mounted so that it can rotate about the first axis 207. The conical gear 245 rotates with a gear 246 which is joined to a gear 247 connected to a control shaft 248 rotatable on an axis fixed with respect to the frame 200. By means of this combination of gears, it is possible to control the axial position of the annular rings from outside of the transmission and thus vary the speed ratio of the transmission in the manner described with reference to FIG. 9.

Figure 15:
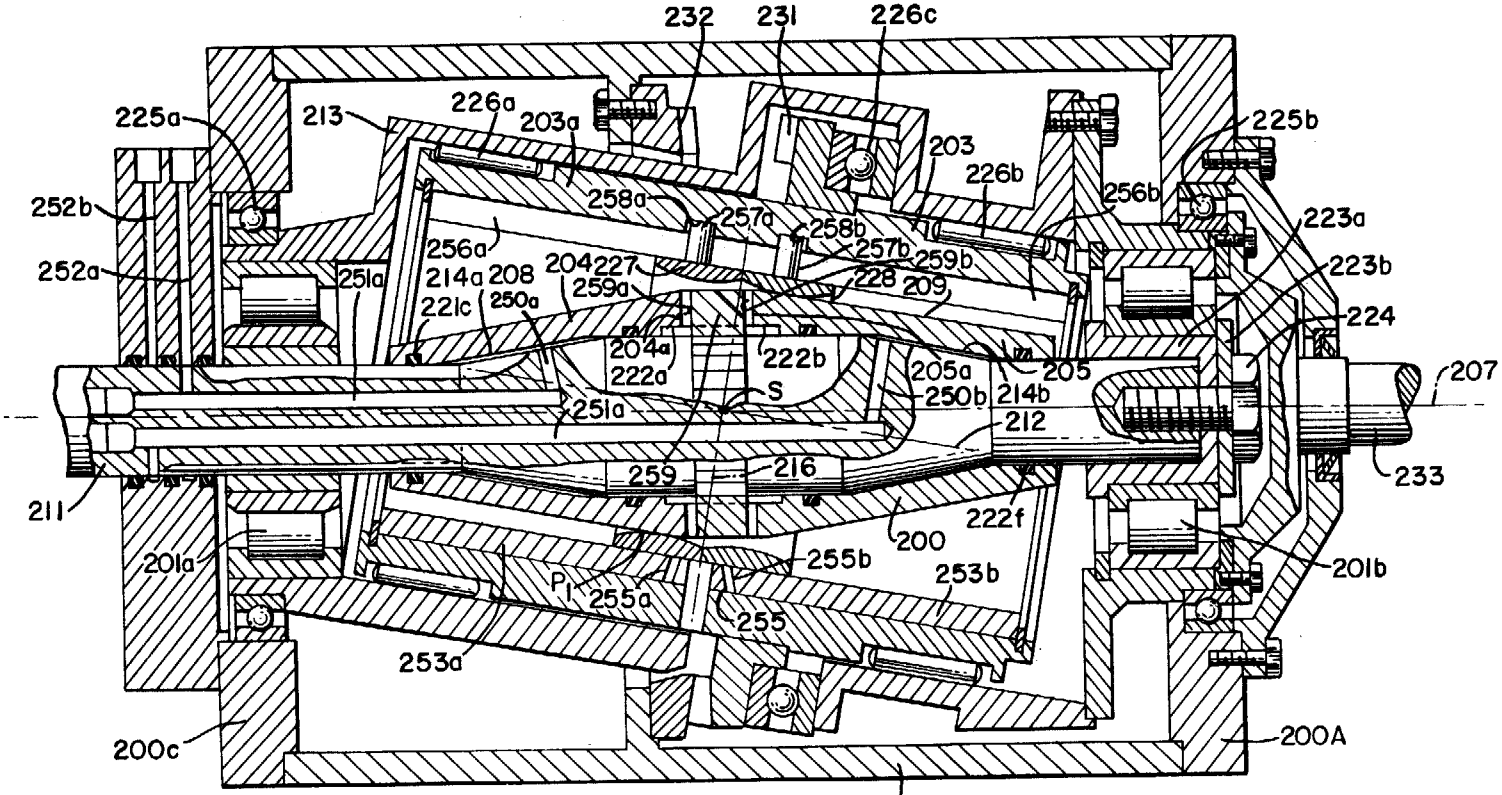
FIG. 15 is a longitudinal section, cut by a plane passing through the first and second axes of still another constructional variation comprising another mechanical system of helixes.

FIG. 15 illustrates a further constructional variation of the embodiment of FIG. 9. In this case, the annular rings are positioned from the outside of the frame by a combination of hydraulic system and gear train.

In the variant of FIG. 15, the apical half-angle of the truncated cones which provide the rolling surface 208 and 209 is again essentially equal to the angle of inclination of the second axis to the first axis. In this case, the mechanical system adjusting the rolling surfaces and creating the normal force $F_N$ is comparable to that previously described in reference to FIG. 13. It includes an annular ring 259 mounted so as to rotate with the shaft 211 by means of grooves. The annular ring 259 is formed with ramps on its end faces in the nature of teeth 259a and 259b. These ramps engage ramps of a complementary form similarly defined by teeth 204a and 205a which are respectively attached to the half-sections 204 and 205 on which are mounted the rolling surface 208 and 209 which are truncated cones. The face inclination of the teeth is such that rotation of the two half-sections 204 and 205 with respect to shaft 211 results in separating the half-sections from each other and squeezing rolling surfaces 208 and 209 against the rolling surfaces 219 and 220 of the second element 203.

Figure 16:
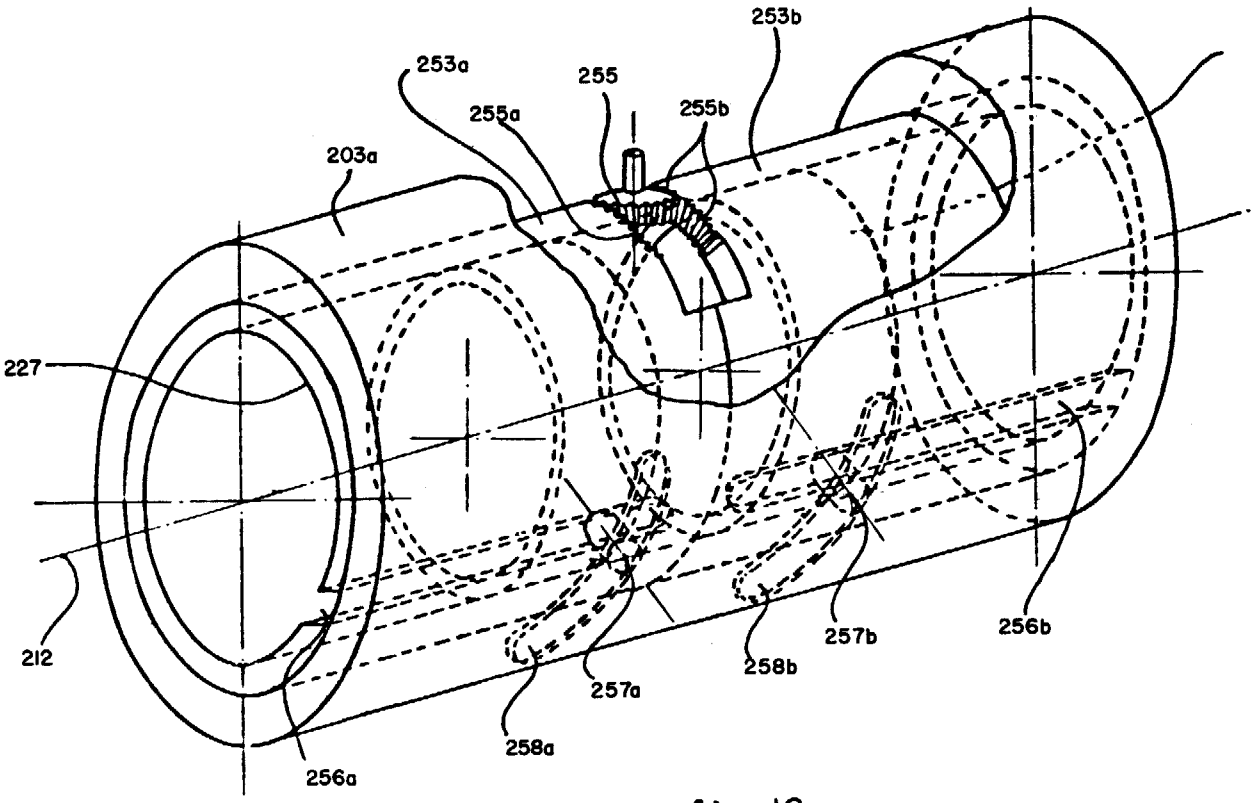
FIG. 16 is a perspective view of the maneuvering component of the variation shown in FIG. 15.

In this variation, the control component that axially positions the annular rings 227 and 228 is shown in perspective in FIG. 16. Thus, the annular rings are arranged to slide inside two cylindrical liners 253a and 253b and to rotate within the second element 203. These two liners 253a and 253b rotate synchronously around the second axis 212 by means of conical gear 255 of apex S, whose rotational axis is located in plane of symmetry 217 and passes through S. This conical gear 255 is mounted so as to be free to rotate on a pivoting shaft journalled in the second element 203 and is engaged with two conical gears 255a and 255b of apex S and attached to the liners. The two liners include two longitudinal slots 256a and 256b in which slide two cylindrical rods 257a and 257b attached to annular rings 227 and 228. The extensions of the two cylindrical rods 257a and 257b slide in two other helicoidal ramps 258a and 258b which are installed in the interior wall of the second element 203.

In operation, the two annular chambers 214a and 214b are independently supplied with fluid under pressure through ducts 250a, 250b, 251a, 251b, 252a and 252b of the type previously described. When the pressure in one of the chambers is increased (for example, in the right chamber 214b), the normal force $F_N$ is increased on one side. As a result, the liner 253b has a tendency to turn more rapidly than the second element 203. When liner 253b turns with respect to the second element 203 in this manner, it produces axial displacement of annular ring 228 by means of the system of slots. Since liner 253b rotates synchronously with liner 253a, the latter, in turn, rotates with respect to the second element by axially displacing the annular ring 227 by means of the other system of slots. The profile of the helicoidal slots 258a and 258b of the second element 203 is calculated in such a manner that the axial movements of the annular rings 227 and 228 are in opposite directions. As long as a pressure differential is maintained between the two annular chambers 214a and 214b, the liners will produce axial displacement of the annular rings.

Figure 17:
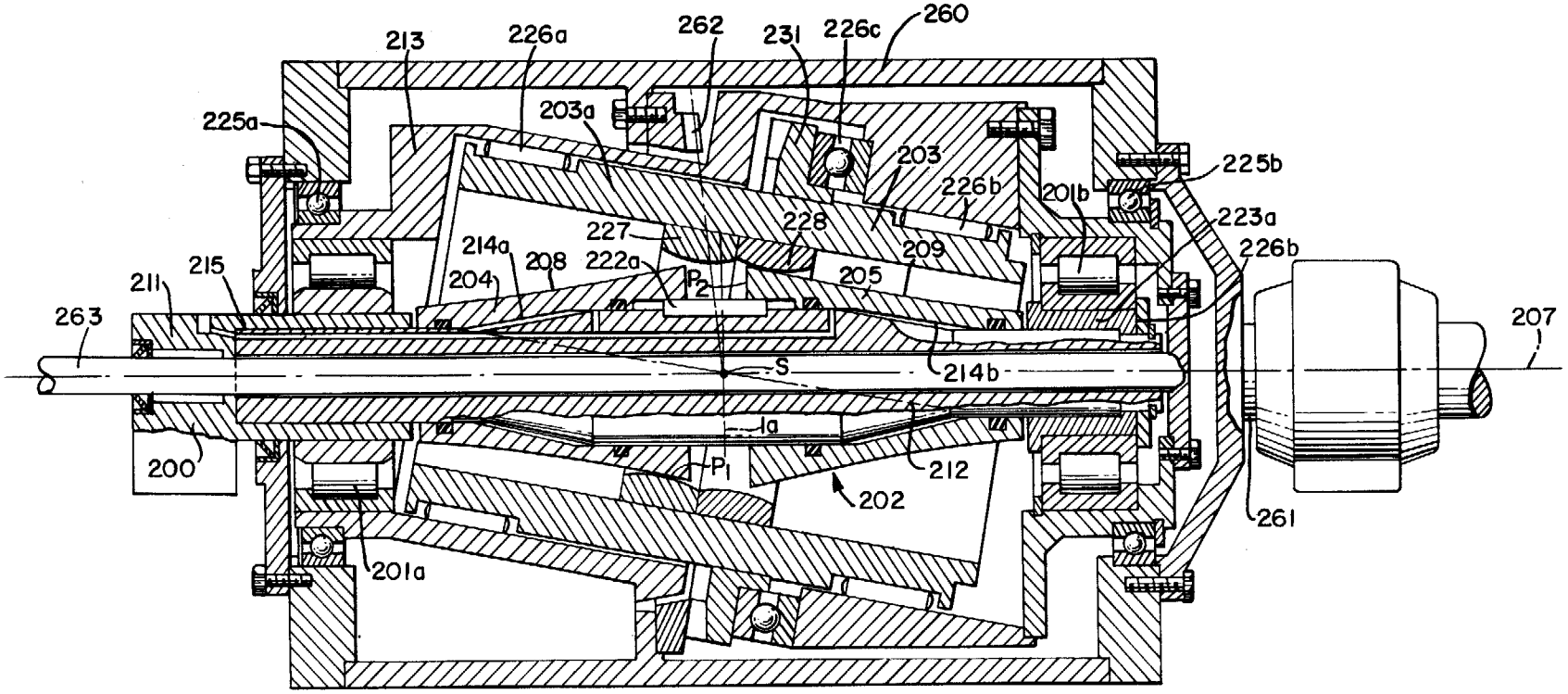
FIG. 17 is a longitudinal section, cut by a plane passing through the first and second axes, of a constructional variation of the type illustrated in FIGS. 10 and 11.

In another constructional variation shown in FIG. 17, the first element 202, which is generally biconical in shape, is fixed and is attached to frame 200 by means of a hollow shaft 211. The crankcase 260 of the transmission rotates around the first axis 207 and is attached to a transmission gear shaft 261. The crankcase is attached to a conical gear 262, of apex S, of the same type as the gear 232 which was described in reference to FIG. 9. This conical gear 262 is engaged with the other gears 231 of the transmission as previously described. The support 213 is attached to a rotating transmission gear shaft 263 which traverses the hollow shaft 211.

Thus, this variation differs from the variation shown in FIGS. 11 and 12 only in that there, *the* first element 202 is mounted to rotate. One of the transmission gear shafts 263 rotates at the velocity Wa of the second element around the first axis 207. The other transmission gear shaft 261 rotates at the velocity Wb* of the second element around the second axis 212 by means of a conical gear train of apex S.

Figure 18:
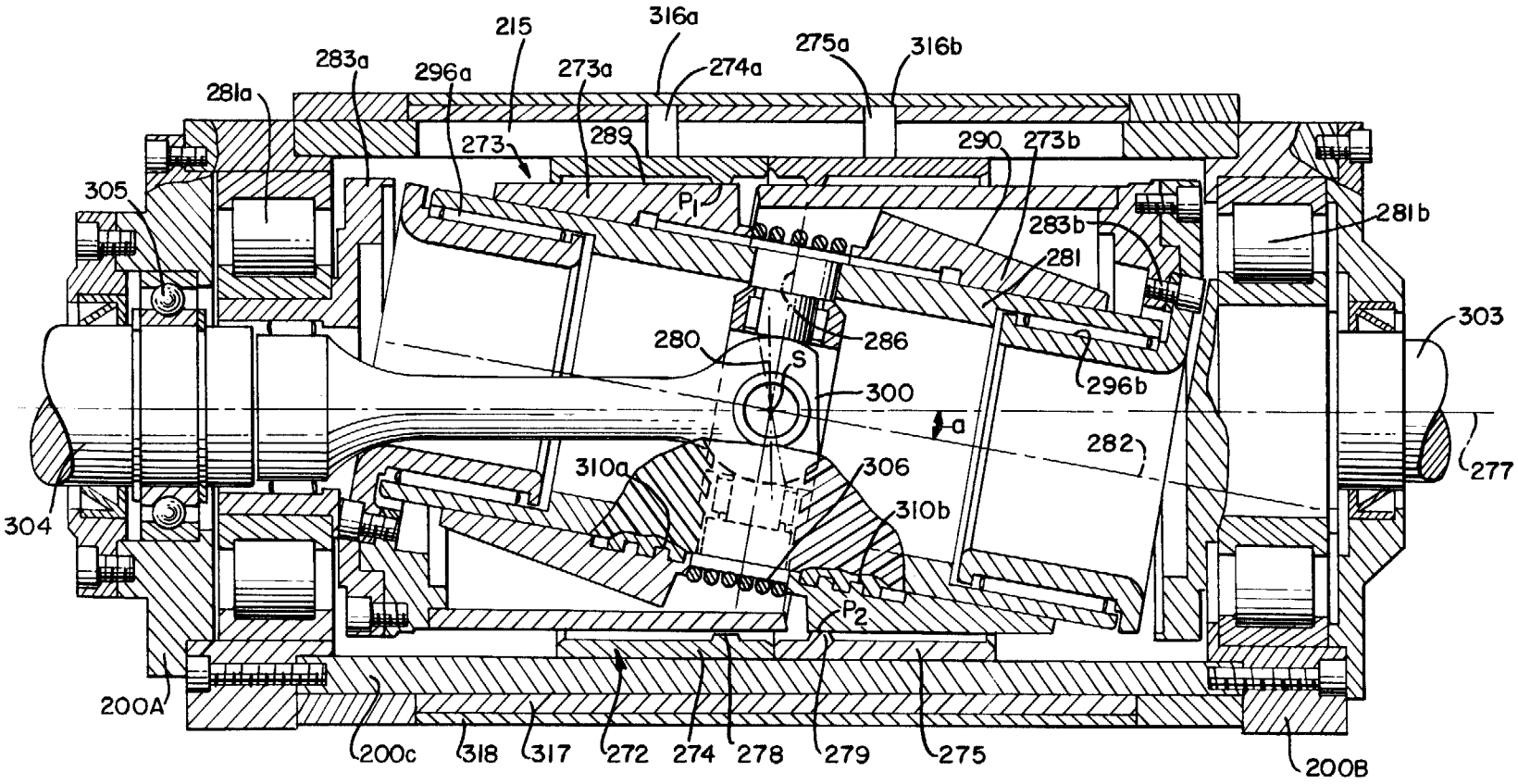
FIG. 18 is a longitudinal section, cut by a plane passing through the first and second axes, of a constructional variation of the type illustrated in FIGS. 13 and 15.

FIG. 18 is a variation comparable to the one described with reference to FIGS. 13 and 15. In the case of this variation, the second element carries the conically shaped bearing tracks. As thus shown in FIG. 18, the transmission includes a frame 200 composed of two flat sides 200A and 200B at each side of its extremities, joined by screws to a crankcase 200C that is essentially cylindrical. On this crankcase is mounted the first element 272 which comprises two half-sections 274 and 275 of a generally annular shape. On these two half-sections are reaction surfaces 278 and 279 that revolve around a first axis 277 (the longitudinal axis of the transmission) and are symmetrically arranged with respect to plane 280 that is perpendicular to the first axis 277 at a point S of this axis. The two half-sections move axially within the crankcase in the longitudinal direction of the first axis 277. These two half-sections are controlled in their axial motion by a control component which will be better understood by reference to a detail view to be described below.

Inside the crankcase is mounted a second element 273 which is also composed of two half-sections 273a and 273b. On these two half-sections 273a and 273b are formed reaction surfaces 289 and 290 having the shape of truncated cones. These two surfaces 289 and 290 revolve around a second axis 282 that converges with the first axis 277 at a point S. Moreover, they are symmetrically arranged with respect to plane 286 perpendicular to the second axis at S.

The angle of inclination a of the second axis to the first axis is constant and essentially equal to the half-angle at the apex of the reaction surfaces.

The two half-sections 273a and 273b are mounted on a hollow shaft 281 that is coaxial with the second axis 282 by means of a system of helicoidal ramps 310a and 310b. This system of helicoidal ramps has the same functions as the system of helicoidal ramps described in FIG. 13.

The shaft 281 and the second element 273 are mounted so as to rotate on the second axis 282 on bearings 296a and 296b which are held at one end by a support 283a which is free to rotate around the first axis 277 and at the other end by a support 283b that rotates with transmission gear shaft 303. The support 283a is itself supported by bearings 281a mounted on side 200A of the frame. The support 283b is itself supported by bearings 281b mounted on side 200B of the frame. Shaft 281 and the second element 273 which rotate at velocity Wb* around the second axis 282 are connected by a universal joint 300 with a transmission gear shaft 304 that is coaxial with axis 277. This shaft 304 is supported by bearings 305. The universal joint 300 is located inside the hollow shaft 281.

It will be noted that the components of this variation of the transmission of the invention bear similarities to the components described in reference to FIGS. 9 and 17. Accordingly, a detailed description of the operation of this variation is believed unnecessary except to point out that shaft 303 drives rotating support 283b at an angular velocity Wa. Since the rolling surfaces 278 and 289 as well as 279 and 280 bear against each other at two points $P_1$ and $P_2$, the second element 273 will roll against the first element 272 while rotating around the second axis at velocity Wb*. Thus, the transmission gear shaft 304, which rotates with the second element, will be driven.

As in certain structural variations already described, the normal force $F_N$ which exerts specific frictional contact pressure at points $P_1$ and $P_2$, is created by the system of helicoidal ramps. In order to put the system of helicoidal ramps into operation upon starting, a spring 306, which is inserted between the two parts 273 and 273b having the shape of truncated cones, pushes surfaces 289 and 290 against the surfaces of the first element in such a manner as to preload the bearing tracks.

The geometry and the kinematics of the second element are adapted in such a way as to produce a gyroscopic couple that will balance the reaction couple due to the normal forces exerted at points $P_1$ and $P_2$. The purpose of this arrangement is to reduce the mechanical stresses, particularly in the bearings, in order to lighten them or to reduce wear on them.

Figure 19:
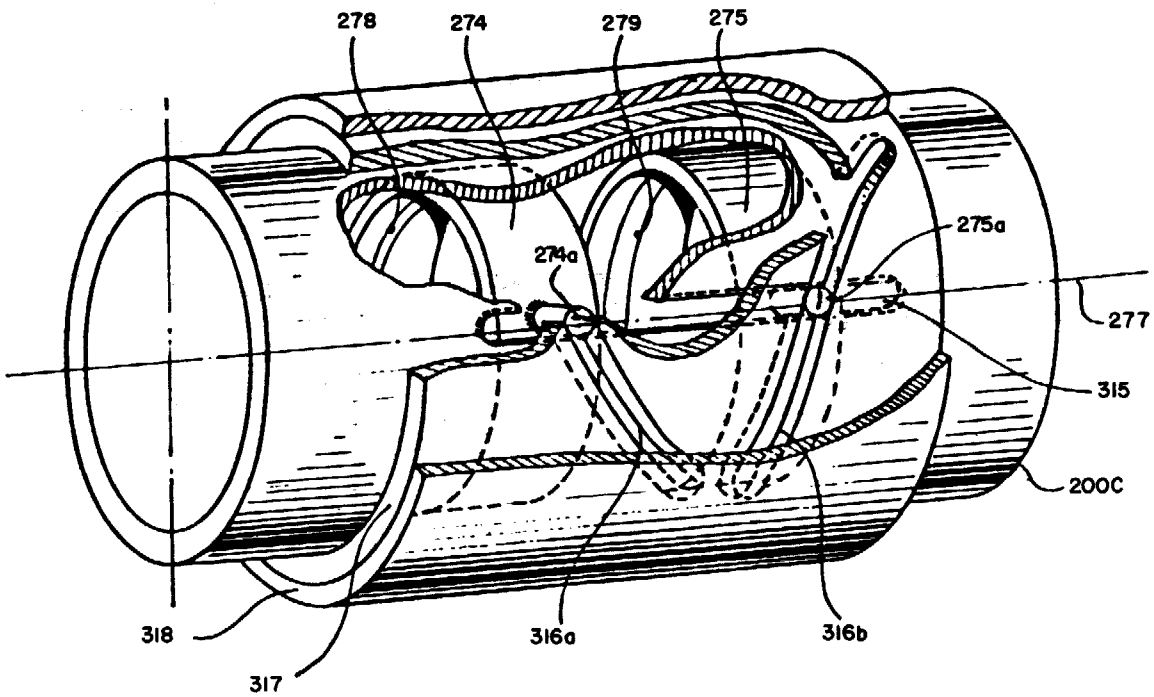
FIG. 19 is a perspective view of the control component of the constructional variation shown in FIG. 18.

In FIG. 19, the control component intended to produce axial motion of the reaction surfaces 278 and 279 of the first element is shown in detail. In this perspective view is shown the cylindrical crankcase 200C, the first axis 277, the two half-sections 274 and 275 of the first element which are annular in shape and on which are formed the rolling surfaces 278 and 279 that revolve around the first axis 277. Two cylindrical parts 274a and 275a are attached to these two half-sections 274 and 275. These two parts 274a and 275a slide in a longitudinal slot 315 of the crankcase and engage a system of helicoidal ramps 316a and 316b, having opposite slopes, that are installed in a liner 317–318 made in two parts in order to facilitate machining of the ramps. The liner 317–318 is coaxial with the crankcase and rotates around the first axis 277. By turning the liner around axis 277, the bearing tracks 278 and 279 are separated to some extent, this motion taking place along the first axis 277.

A further alternative embodiment of a transmission in accordance with this invention is shown in FIGS. 20–23 of the drawings. Although many of the components will be familiar from the embodiments described previously, these components will be briefly identified to provide a basis for a clear understanding of these components in the context of modified structure shown in FIGS. 20–23.

Figure 20:
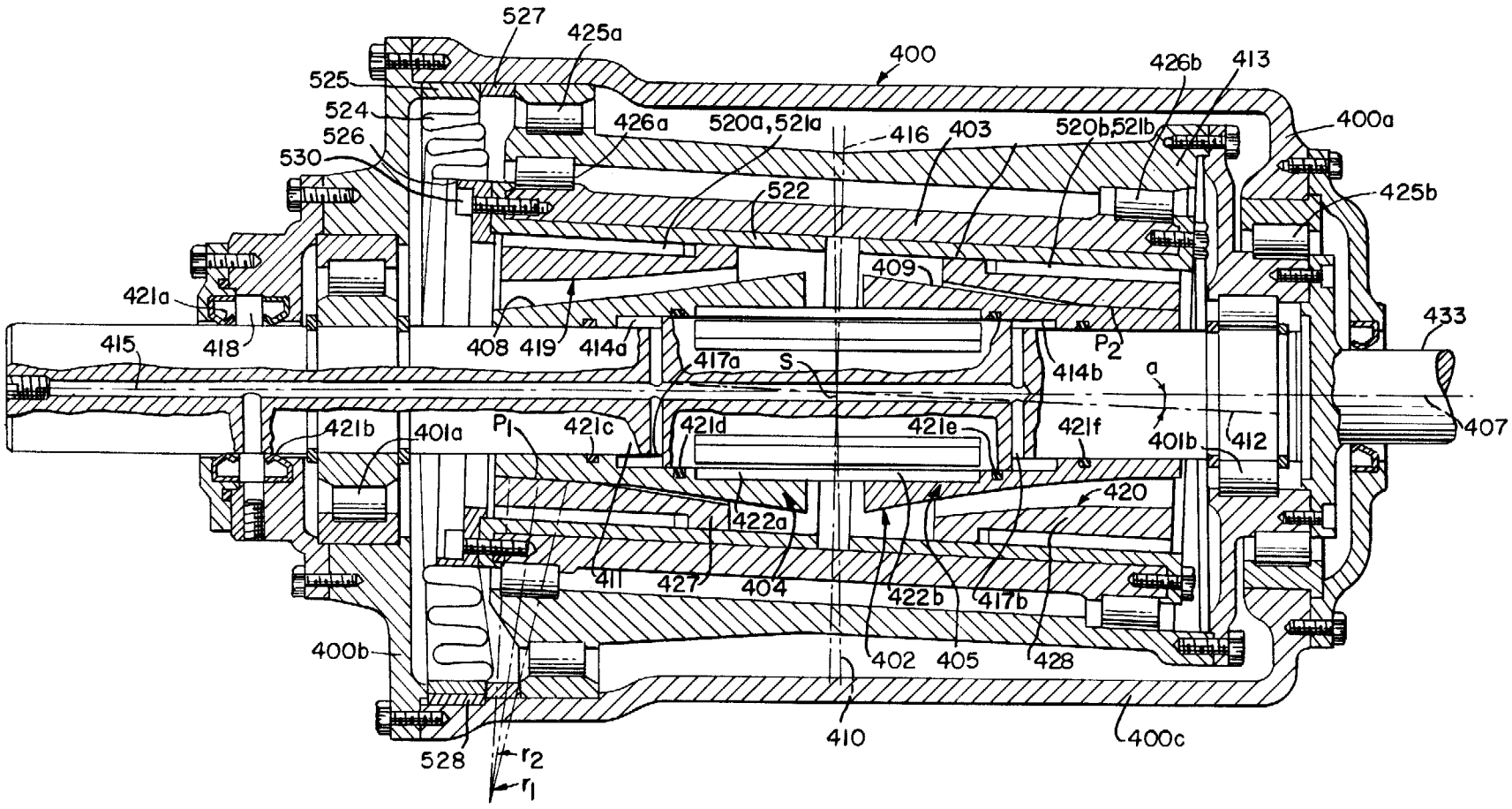
FIG. 20 is a longitudinal section of still another embodiment of a transmission in accordance with this invention.

The transmission shown in FIG. 20 includes a fixed frame 400 having two end parts 400a and 400b joined by a crankcase 400c of a generally cylindrical form. A first element 402 and a second element 403 are rotatably mounted in the frame by bearings identified below. The first element 402 is rotatable around a first axis 407 which is the longitudinal axis of the transmission and is fixed with respect to the frame 400. The first element 402 is composed of two half sections 404 and 405 containing two rolling surfaces 408 and 409 approximately though not precisely the shape of truncated cones. The sections 404 and 405 are mounted on a shaft 411 (output shaft) that is coaxial with the first axis 407 and are movable axially with respect to each other in the longitudinal direction of the first axis 407. Keys 422a and 422b fasten the sections 404 and 405 to the shaft 411 so that they may rotate together.

Two annular chambers 414a and 414b are provided between the interior wall of the two sections 404 and 405 and the exterior surface of shaft 411. These annular chambers communicate with a source of fluid (not shown) by conduits 417a, 417b and 415 which are formed in the body of shaft 411. A cylindrical groove 418, which surrounds shaft 411, permits introducing a fluid into chambers 414a and 414b when shaft 411 rotates on its own axis 407. Sealing joints 421a, 421b, 421c, 421d, 421[d]*e* and 421f assure tightness of the system of annular chambers and of the fluid supply conduits for these annular chambers. By introducing a fluid into the annular chambers 414a and 414b, the two sections 404 and 405 and their rolling surfaces 408 and 409 will be simultaneously displaced axially, thus separating them. As a result of this hydraulic system, the relative positions of contact points $P_1$ and $P_2$ between the rolling surfaces may be modified to alter the transmission ratio.

The shaft 411 is supported at each end of the frame 400 by a system of bearings including a first series of roller bearings 401a and 401b which are coaxial with the first axis 407. A support 413 is rotatable around the first axis 407 by a system of bearings 425a and 425b between the frame 400 and the support 413. Thus, the first element 402 may turn with respect to the support 413 which, in turn, may rotate with respect to the frame 400. This support 413, which is essentially symmetrical, is inclined with respect to the longitudinal axis 407 of the transmission and supports the second element 403 by means of roller bearings 426a and 426b.

The second element 403 is a solid of revolution, cylindrical in form, and is rotatably carried within the support 413 on a second axis 412 passing through point S of the first axis 407 and inclined at a constant angle a with respect to the latter. The second element 403 includes two rolling surfaces 419 and 420 which revolve around the second axis 412 and are arranged in symmetrical fashion with respect to a plane 416 which is perpendicular to the second axis at point S. These rolling surfaces are formed on two annular rings 427 and 428 which are movable axially with respect to each other in the longitudinal direction of the second axis 412, inside the body of the second element 403, but rotate together with the second element 403.

Figure 21:
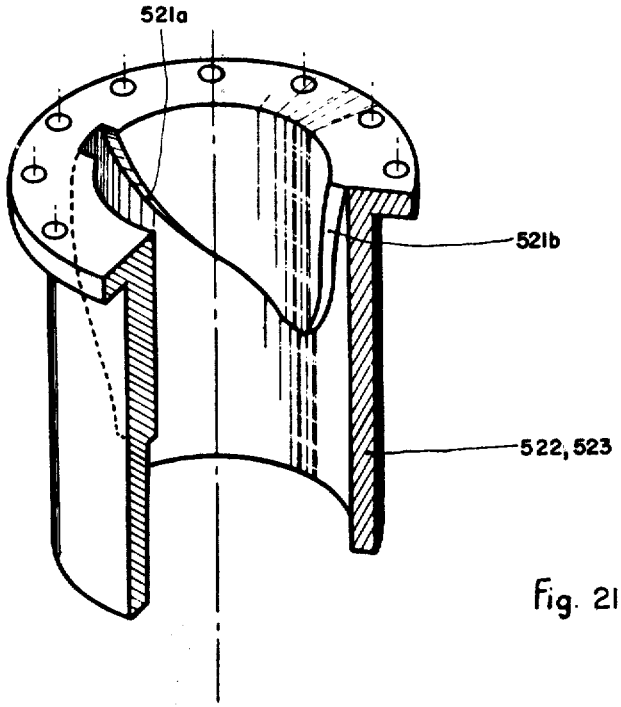
FIGS. 21, 22 and 23 show respectively, in perspective and on a larger scale, three components of the embodiment of FIG. 20 which differ from similar components of previous embodiments.
Figure 22:
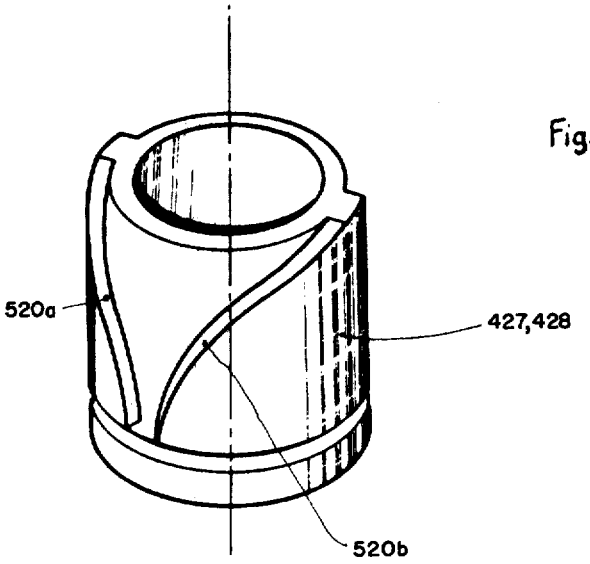

A mechanical system drives the two rolling surfaces 419 and 420 of the second element 403 axially in such a manner as to force them against the rolling surfaces 408 and 409 of the first element 402 at the two contact points $P_1$ and $P_2$. The several designs of this mechanical system described above are applicable in the case of the present embodiment. By way of illustration, a still further system is shown in FIGS. 20–22. In this instance, each ring 427 and 428 (FIGS. 20 and 22) is provided with exterior helicoidal ramps, opposite in direction, and which make contact with interior helicoidal ramps 521a and 521b borne by sleeves 522 and 523 which are disposed within the second element 403 and fastened to it. The reaction between the helicoidal ramps 520a and 520b, on the one hand, and 521a and 521b, on the other hand, has a tendency to separate the sections 404 and 405 from each other and to urge the surfaces 408 and 409 against the surfaces 419 and 420 with a normal force sufficient to transmit the input torque couple of the transmission without slipping. Such input torque is supplied by an input shaft 433 mounted so as to rotate in support 413 in coaxial alignment with the axis 407.

Although the operation of the transmission described to this point with reference to FIG. 20 is practically identical to the one for which several designs have been described above, it would be helpful to review its operation. The reaction surfaces 408 and 409 of the first element 402 are in rolling frictional contact at $P_1$ and $P_2$ against rolling surfaces 419 and 420 of the second element 403. The specific contact pressure is created by the ramps 520a, 520b, 521a and 521b. Due to the action of the input torque applied to shaft 433, surfaces 419 and 420 are caused to revolve at a velocity Wb* in relation to the second axis 412 and also in a conical motion around the first axis 407 at velocity Wa.

The aforementioned rotational velocities Wb* and Wa and the rotational velocity W of the first element 402 around axis 407 are related to each other by a kinematic equation depending on the geometry of the bearing tracks. In the present case, the velocities Wa and Wb* are maintained at a constant ratio (equal to 1). Therefore the transmission output shaft 411 will be driven at only one output velocity for a given relative position of points $P_1$ and $P_2$.

It should be pointed out that the surfaces 408 and 409 of the first element 402 and the surfaces 419 and 420 of the second element 403 automatically center themselves symmetrically with respect to point S. In fact, decentering of one of the surfaces of the first element would have the effect of correlatively decentering the corresponding surface of the second element. Consequently, the pressure at contact points $P_1$ and $P_2$ would be different since one of the surfaces would receive less thrust from the helicoidal ramps 520a and 520b than the other one. This would result in a difference of fluid pressure contained in annular chambers 414a and 414b which is not possible due to the connection of these chambers. Thus, any dissymmetry which may occur between the surfaces is corrected automatically.

In the embodiment of FIGS. 20–23, a mechanical linkage of special design is employed between frame 400 and the second element 403 in order to prevent the latter from turning around the first axis 407 with respect to frame 400. (Consequently Wa=Wb*; Wb=0). This linkage is arranged to drive the second element 403 at one of the longitudinal extremities thereof, e.g., the left extremity in accordance with FIG. 20. Although this system could be designed to use an Oldham or similar joint, it is preferable to design it using a transverse component connecting frame 400 to the second element 403 and providing, on the one hand, sufficient flexibility in the transverse direction to permit conical movement of the second element 403 around point S and, on the other hand, providing practically zero flexibility in the circumferential direction.

Figure 23:
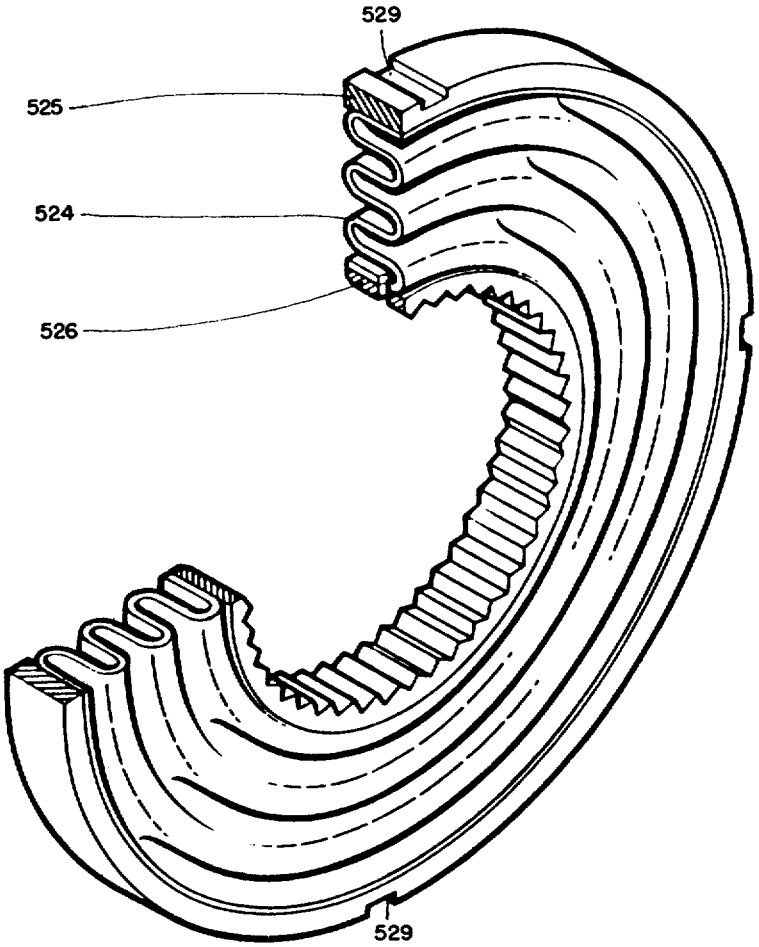

In the preferred design of the linkage referred to in the preceding paragraph and which is depicted in FIGS. 20 and 23, the abovementioned transverse component is an annular diaphragm 524 with concentric corrugations having an exterior edge attached to frame 400 by a first rigid ring 525 and having an interior edge attached to the second element 403 on one of the extreme ends of the latter by a second rigid ring 526. Ring 525 may be axially secured by the end frame 400b against the exterior race of bearing 425a and an annular block 527 and prevented from rotating by keys 528 in exterior slots 529 (FIG. 23) of ring 525. The ring 526 can be attached to the second element 403 by a screw 530 which also serves to attach the annular ring 522. The operation of the diaphragm 524 (or equivalent component) is similar to the conical gears described above with respect to FIGS. 9–19. It facilitates the construction of the transmission by freeing the central portion of the latter and by permitting the entire essentially cylindrical portion of the support 413 to be constructed in one piece.

Another aspect of the embodiment of FIGS. 20–23 concerns the shape of the rolling surfaces 408 and 409 of the first element 402 and the surfaces 419 and 420 of the second element 403 which facilitate a relatively small axial displacement by the hydraulic control system but which will result in a relatively large axial displacement of contact points $P_1$ and $P_2$. For this purpose, these rolling surfaces have curved generatrices whose radii of curvature are comparable to each other and are long with respect to the average distance of each surface from its axis of revolution 407 or 412. The ratio between these radii of curvature and this average distance is preferbaly between about 10 and 100. Thus, the generatrices of the two surfaces 408 and 409 of the first element 402 are curved so that these surfaces are concave in form whereas the generatrices of the two surfaces 419 and 420 are curved so that these latter surfaces are convex in form. In FIG. 20, $r_1$ indicates the radius of curvature of one of the two generatrices of the surface 408 which are located in the plane of the figure and $r_2$ indicates the radius of curvature of one of the two generatrices of surface 419 which also is located within this plane, these two generatrices being tangent at point $P_1$. Radius $r_1$ is slightly larger than radius $r_2$ but is of the same order of magnitude.

The radii of curvature $r_1$ and $r_2$ can be calculated as a function of the angle of inclination a so as to obtain the desired result. This result is a compromise between acceptable efficiency (related to the area of the contact zones) and a large displacement of points $P_1$ and $P_2$ for a relatively small displacement of sections 404 and 405 and, consequently, of rings 427 and 428. Because of this, a variation of transmission ratio is obtained which is not only economical but practically without inertia.

To provide an understanding of the manner in which various embodiments of the transmission previously described may be used with a reciprocable input, reference is now made to FIGS. 24–32. The organization shown in these figures concerns various types of power plants in which reciprocal piston movement of such thermal engines as a Stirling engine or internal combustion engines operable in accordance with well known Otto and/or Diesel thermal cycles, is converted to output torque directly by the transmission of this invention.

Figure 24:
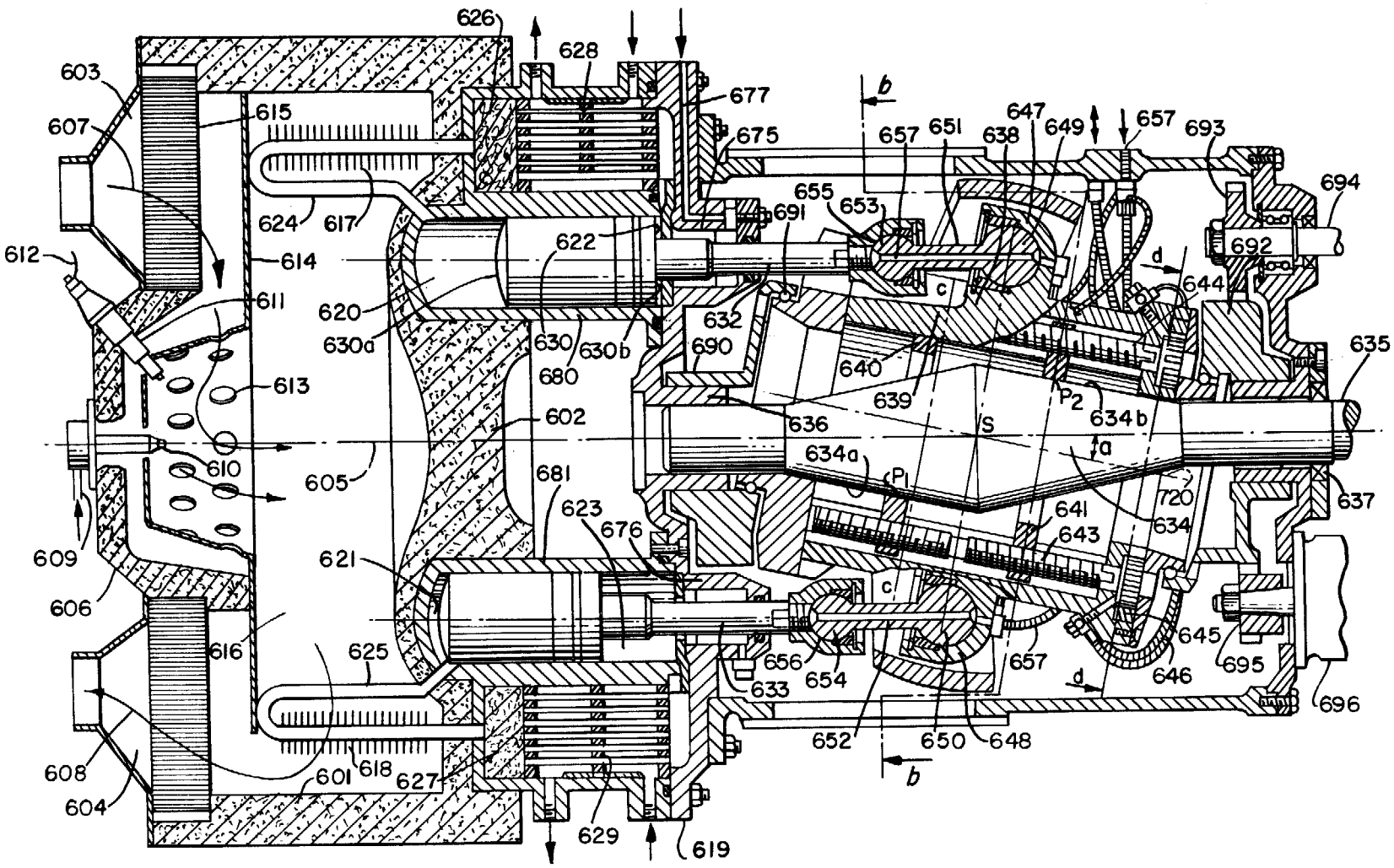
FIG. 24 is a longitudinal cross section through one embodiment of an engine incorporating a transmission of the invention.
Figure 28:
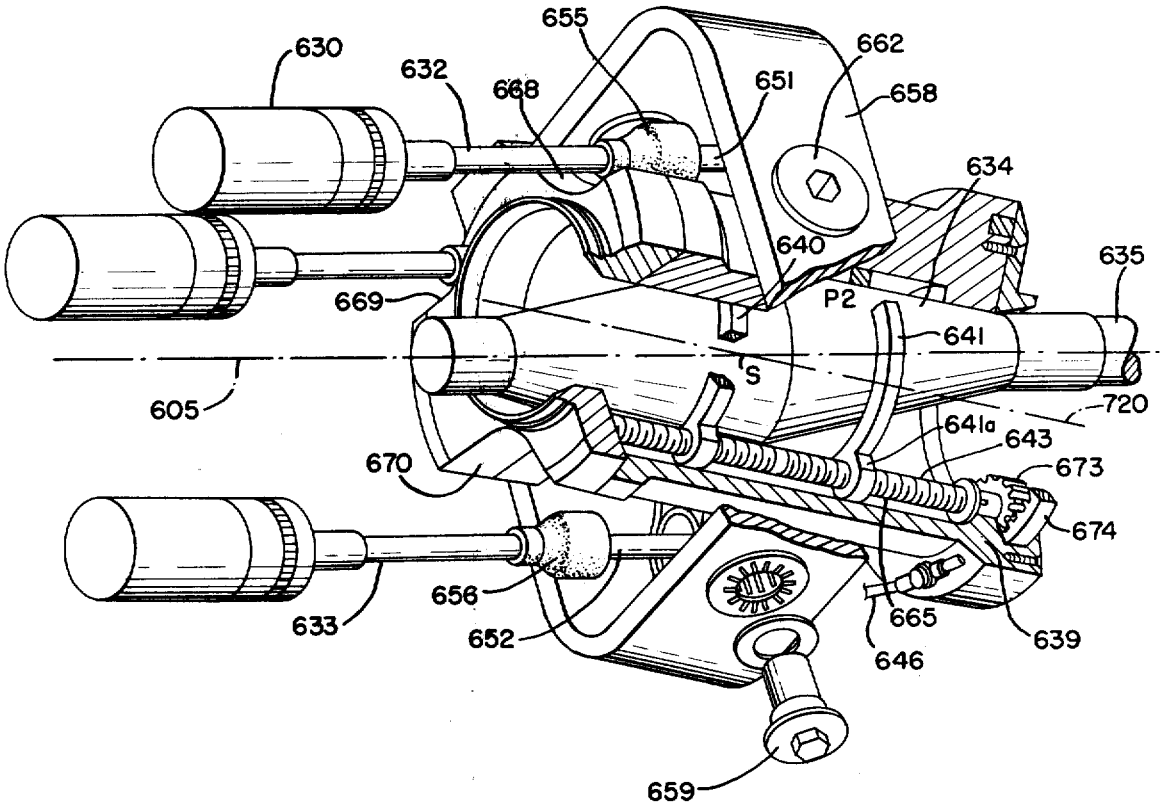
FIG. 28 is a cutaway perspective view illustrating the movable components of the embodiment of FIG. 24.

In FIGS. 24 and 28 of the drawings, an embodiment is shown to employ a heat engine of the Stirling cycle type including an enclosure 601 of high heat-resistant material, i.e., ceramic. The approximately circular enclosure delimits a chamber 616 closed at one end by a ceramic wall 602 and communicating with the exterior through two apertures 603 and 604 in a well 606 which closes the other end of the chamber. The center of the enclosure is the longitudinal axis of the heat engine.

The apertures 603 and 604 are designed so as to permit the entry of air needed for combustion of fuel and evacuation of the exhaust gases in the direction indicated by arrows 607 and 608, respectively. The fuel is supplied by tubing 609 in the longitudinal axis of the engine and injected into the chamber through the port 610. A sparkplug 611 connected to an electric source (not shown) by the wire 612 initiates combustion. Air enters the chamber by way of a number of ports 613 in the well 614 so as to intermix air and fuel homogenously.

In order to recover a part of the heat in the exhaust gases, a rotating heat exchanger 615 is provided. Cold intake air is heated during passage through the exchanger 615 heated by the exhaust gases. Within the chamber 616 are four finned reheaters, only two of which, 617 and 618 are visible in FIG. 24. A good heat-conducting gas with low viscosity, e.g., hydrogen or helium, circulates within the reheaters. The way in which the reheaters are connected to the chambers of the heat engine will be described below.

The heat engine has a system of cylindrical chambers mounted on the body or frame 619 thereof in a circle around longitudinal axis 605 of the engine. Such chambers including four variable-volume chambers at high mean temperature, only two of which 620 and 621 are shown in FIG. 24 and four variable-volume enclosures at low mean temperatures, two of which 622 and 623 are also shown in FIG. 24.

The chambers at high mean temperature are housed in the ceramic wall 602 terminating at the combustion chamber 616. Tubing 624 and 625 connect chambers at high mean temperature 620 and 621 to chambers at law mean temperature 622 and 623, the latter being shifted by 90° around engine 605 in relation to the hot chambers. The tubing also connects the reheaters 617 and 618, regenerators 626 and 627 and radiators 628 and 629.

The regenerators are of ceramic material and operate to withdraw part of the heat energy from the active fluid when it is hot and heat it after cooling. The radiator 628 and 629 have a flow of water and cool the hot gas which flows through them. The active fluid (hydrogen or helium) circulates alternately from the hot chamber to the cool chamber and traverses, first in one and then the other direction. The reheater, regenerator and radiator are well known components in a Stirling engine.

The chambers are defined by cylindrical walls 680 and 681 in which pistons 630 reciprocate on axes parallel with the longitudinal engine axis The hot variable-volume space 620 is closed by the face 630a of piston 630 and the cool variable-volume 630b is closed by the other face 630b of the same piston. The piston cylinders are integral with the body 619 and the ceramic wall of 602 of the combustion chamber 616. They are uniformly offset by 90° around axis 605.

Further description of the well known Stirling cycle is believed unnecessary except to note that it has four phases (injection, compression, expansion, cooling) and that the pistons travel parallel to axis 605. Also, the alternate motion of the pistons is out-of-phase by an angle of about 90°.

The alternate motion of the pistons is transmitted by a system of connecting rods 632 and 633 to a transmission to be described further below. The connecting rods 632, 633 are sealed by deformable skirts 675, 676 to the walls of the low temperature chambers space to prevent leakage. In order to balance the pressure within the chamber, a counterpressure is provided downstream of the skirt by a pressurized fluid injected through the channel 677.

Shown on the right side of FIG. 24 is a transmission having a rotating element 634 of biconical configuration for rotation as an integral portion with a torque output shaft 635. The element 634 is supported by two bearings 636 and 637 centered on the axis 605. The element 634 has two conical rolling surfaces 634a and 634b, thus arranged symmetrically on either side of a point S of the axis 605. These surfaces revolve around the axis 605 and the transverse dimension or radius decreases progressively from a plane perpendicular to the axis 605 at point S.

Figure 27:
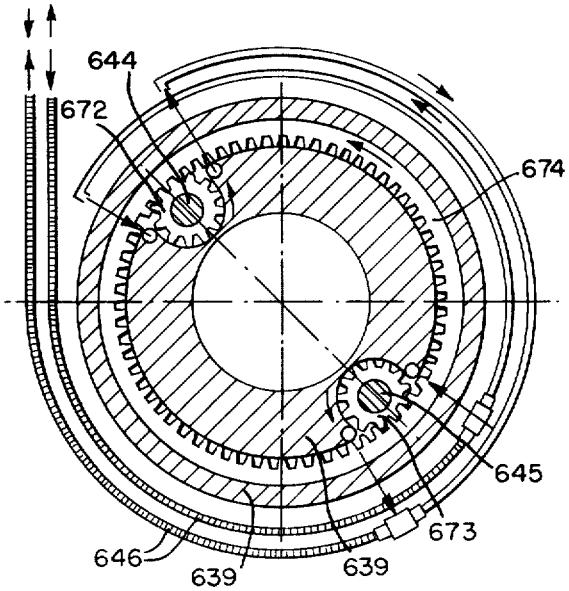
FIG. 27 is an enlarged fragmentary cross section taken on line d—d of FIG. 24.

The transmission also has a universally pivotal bed plate (sometimes called a swash plate) 638 in the nature of a radial flange-like projection on an elongated, generally cylindrical body 639 in which are mounted two axially adjustable rings defining circular rolling reaction surfaces 640 and 641. The axis 720 of the cylindrical body passes through the point S of the axis 605 and is inclined from the latter by an angle a. The angle a is substantially equal to the half-angle at the apex of the conical rolling surfaces 634a and 634b. The rolling surfaces 640,641 revolve in planet fashion about the axis 720 and are movable axially in relation to each other along that axis. The rolling surfaces 640, 641 being formed on the two annular rings as shown, are adjustable symmetrically in relation to a plane perpendicular to the axis 720 of the cylindrical body at point S by two threaded rods 643, 644 each having a right-hand thread and a left-hand thread engaged by nut-like internal threads on the rings defining the surfaces 640 and 641. The rods are rotated by a reversible hydraulic drive device 645 mounted at the end of the cylindrical body 639. Hydraulic fluid supply tubes for the drive device are shown in FIGS. 24 and 27 at 646, 646a, 646b. The rolling surfaces 640 and 641 are kept in contact (by means to be described below) with the conical surfaces 634a and 634b of the rotating element at the two points $P_1$ and $P_2$.

Figure 25:
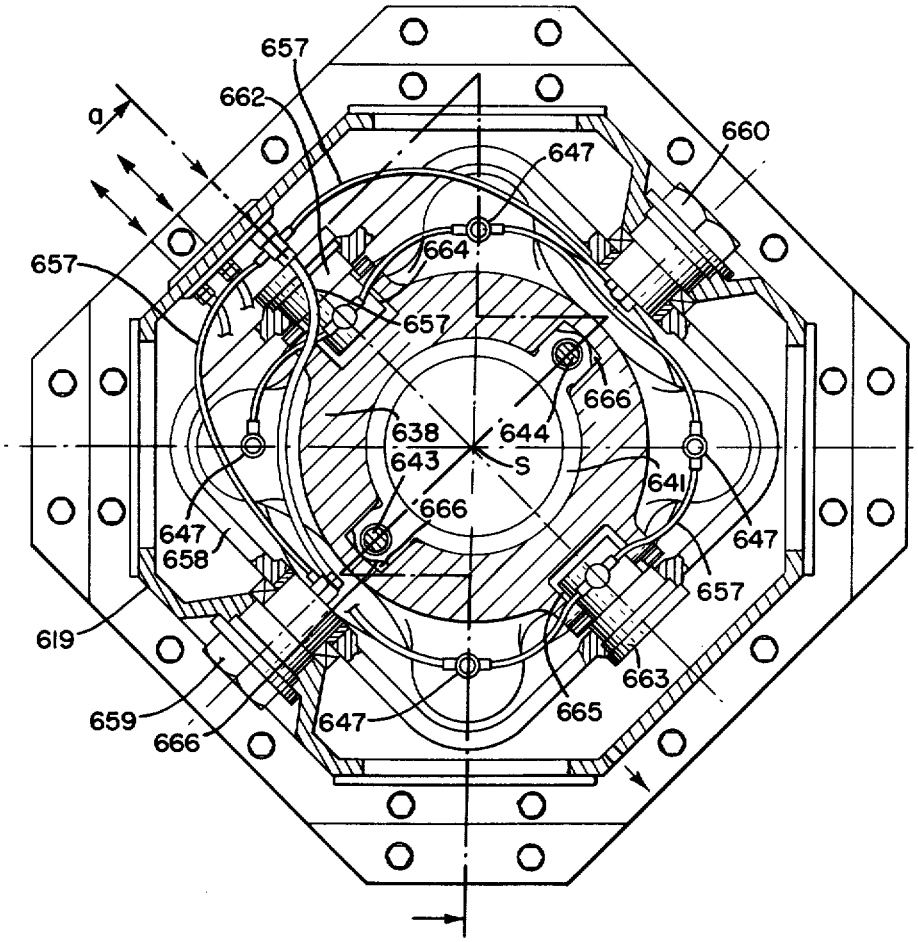
FIG. 25 is a cross section on line b—b of FIG. 24.

The bed plate 638 is supported from the frame 619 by a gimbal system shown in FIG. 25 so that the plate can veer or pivot freely in all directions about the point S. The axis 720 of the cylindrical body 639 therefore may be moved to define a nutational double cone with a common apex at S and with a half-angle equal to a at the apex S.

At the periphery of the bed plate are four bosses 647 and 648 shown in FIG. 24. The bosses define sockets to receive ball portions 649 and 650 of ball-and-socket joints having centers lying in a plane perpendicular to the axis 720 at point S, the ball portion of such joints being integral with links 651 and 652. The links are also integral at the other end with ball portions 653, 654 of ball-and-socket joints. The balls 653 and 654 are lodged in the semispherical recesses 655, 656 at the ends of the connecting rods 632, 633. Lubricating circuits 657 supply oil to the bearings of the rotating element 634, the ball-and-socket joints and to the shaft articulations of the gimbal system.

The ends of the cylindrical 639 are rotatably connected by bearings 691 with two auxiliary components 690, 692 rotatable about the axis 605 at the same speed Wa as axis 720. Although the bearings 691 are depicted in the drawings as ball bearings, they allow a slight degree of relative pivot motion of body 639 about the axis S to effect deployment of the gyroscopic couple in a manner described above with respect to FIGS. 1–8. The masses of the two components 690, 692 are so distributed as to balance out the rotating couple of reaction on the body 639 caused by forcing the rolling surfaces 640 and 641 against the conical surfaces of the rotating element 634. In addition, one of the auxiliary components 692 has a toothed rim meshing with both a crown wheel 693 of take-off shaft 694 and with crown wheel 695 driven by a starting mechanism 696. The latter is provided to initiate the veering motion of the bed plate during the starting of the transmission and the heat engine. The take-off shaft 694 is used to activate the mechanisms of the heat engine which must be set in motion at a speed proportional or equal to the speed Wa of axis 720 around axis 605.

The gimbal system supporting the veering bed plate 638 is shown clearly in FIG. 25. The gimbal system includes a square cage 658 which turns freely on pivots 659 and 660 integral with the frame 619 and having axes passing through the point S. The cage 658 itself has two pivots 662, 663 on axes also passing through the point S and movable freely in the two bosses 664, 665 of the bed plate 638.

FIG. 25 also shows the network of lubricating circuits which oil the bearings of the pivoting parts, specifically the four bosses 647 (seen from the back), in which are articulated the ball-and-socket joints of the connecting rod head and the four pivots 659, 660, 662, 663 for articulation of cage 658.

Also shown in this figure are the ends of the threaded rods 643, 644 which adjust the rolling surfaces 640 and 641 along the longitudinal direction of axis 720. It will be noted that the rings forming the rolling surfaces 640 and 641 have shoulders, such as 641a, sliding within grooves, such as 666, in the cylindrical body 639 integral with the bed plate 638. Due to the grooves and shoulders, the axially adjustable rolling surfaces are fixed in rotation with the veering motion of the bed plate.

Figure 26:
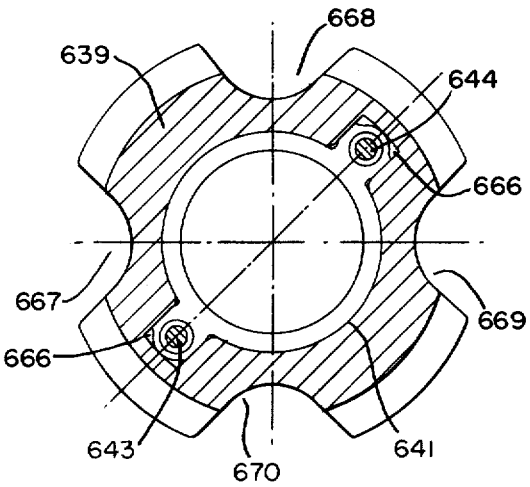
FIG. 26 is a fragmentary cross section on line c—c of FIG. 24.

Shown in FIG. 26 are the threaded rods 643, 644 for adjusting the annular rings on which the tracks 640 and 641 are formed. Also shown are four cutouts 667, 668, 669, 670 which allow passage of the articulated links along the outside of cylindrical body 639.

In FIG. 27 the threaded rods 643, 644 are shown as coupled to the gears 672, 673 lodged in recesses of the cylindrical body 639. These gears mesh with a crown wheel 674 rotatable freely in a groove of the cylindrical body 639.

In a known manner, the hydraulic fluid rotates the crown wheel, thus rotating the threaded rods back and forth and consequently inducing the axial displacement of the rolling tracks 640, 641.

The manner in which the linkage arrangement thus described drives the bed plate in a veering movement with angle a at a speed Wa around the point S will be described in more detail below.

The mechanical system for forcing the rolling surfaces 640, 641 of the body 639 against the rolling surfaces 634a, 634b of the rotating element 634 is of gyroscopic origin and described above.

Although this system need not be again fully described it will suffice to note that the whole of the forces of elementary inertia originating in the mass of the bed plate 638 and of the cylindrical body 639 due to the center of gravity of the bed plate and body lying on the point S, is reduced to a couple whose intensity is a function of (a) the principle moments of inertia of the component defining the bed plate 638 and cylindrical body 639 in relation to the axis 720 and in relation to an axis passing through S perpendicular to the axis 720; (b) of the angle a of inclination of the axis 720 in relation to longitudinal axis 605; (c) of the speed Wa of axis 720 in relation to axis 605; (d) of the speed Wb* of the bed plate 638 and body 639 about the axis 720 (the speed Wb* having been measured in a frame of reference rotating at the speed Wa with axis 720). The speed Wb of the bed plate and body around axis 720 is zero in this instance because of the gimbal connection to the frame 619. Thus, the absolute value Wb* is equal to the speed Wa of axis 720 around axis 605.

The developed force couple causes the tilt of bed plate and cylindrical body so as to force the surfaces 640, 641 in contact at $P_1$ and $P_2$ with the rolling surfaces of the rotating element 634. The force of contact at $P_1$ and $P_2$ as a result of the gyroscopic couple is adequate in normal operation to prevent slippage of surfaces 640 and 641 on the surfaces 634a and 634b. The internal forces of the piston motion are added to those of the gyroscopic couple. These inertial forces reach their maximum at the end of their stroke and appreciably contribute to the force by which the respective rolling surfaces are retained against each other.

Movement of the bed plate in a veering motion about the point S by the pistons causes rotation of the rotating element 634 and, consequently, of take-off shaft 635 due to nutational movement of the annular surfaces 640, 641.

Previously, there is described the kinematic relation linking the speed of rotation W of the rotating element to the speed Wa of axis 720 around axis 605. This relation is a function of the ratio of the gyratory radii of the points $P_1$ and $P_2$ in relation to axis 605 and in relation to axis 720. A modification of this ratio involves a modification of the ratio speeds Wa and W of the bed plate and of the rotating element. Since the speed Wa of the bed plate itself is a function of the frequency of the alternate motion of the pistons, it is possible to vary the speed W of the take-off shaft without modifying the frequency of piston action by changing the ratio of the gyratory radii.

The mechanism permitting axial displacement of tracks 640, 641 is described above. Taking into account the angular equality between the half-angle at the summit of the rolling surfaces 634a and 634b and the angle of inclination a of axis 720 from axis 605, it will be seen that the axial displacement of pistons 640 and 641 does not produce any change in the angle of inclination a or any change of the gyratory radius of the point of contact around axis 720. On the other hand, this axial displacement modifies the value of the gyratory radius of the contact points $P_1$ and $P_2$ in relation to axis 605. Due to this fact, the mechanism of axial displacement of the pistons allows change in the speed W of the take-off shaft in relation to the frequency of piston action.

In FIGS. 29–32 of the drawings, an alternative embodiment of the invention is shown in which the force holding the rolling surfaces of the first and second transmission elements against one another is developed by mechanical means generating a force couple counterbalanced by the aforementioned gyroscopic force couple. The particular heat engine illustrated in FIG. 29 includes pistons 822 reciprocable in cylinders 824 arranged in a circle around the longitudinal (or first) axis 840 of the transmission. In other words, pistons 822 reciprocate in directions parallel to the first axis 840. Also, the longitudinal axes 843, 844 of the cylinders and pistons are therefore substantially parallel to the first axis 840. In a known manner, the pistons are driven by the combustion and expansion of thermal fluid drawn into the cylinders and exhausted therefrom through a system of valves activated by cams 833.

The frame 832 of the transmission is mounted integrally with the cylinders 824 by emplacement of the four cylinders in an annular chamber 823. A space is provided between the chamber walls and the outer walls of the cylinder so as to permit circulation of a cooling fluid. The four cylinders and pistons of the heat engine are mounted uniformly around the first axis 840 spaced 90° from each other. It should be noted that it is not absolutely necessary that the heat engine have four cylinders. It may have more but should preferably have at least three.

The output of the engine is by way of a transmission, to be described, to a torque delivering shaft 801 rotatable in relation to the frame 832 about the first axis 840 by a series of bearings 802 and 803 mounted at each end of the transmission frame 832. This shaft 801 defines part of a first element 805 having two rolling surfaces 805a and 805b, revolving around axis 840. The surfaces have a generally conical configuration and are disposed symmetrically on either side of a plane perpendicular to axis 840 at a point S. The surfaces 805a and 805b are coupled for rotation with the shaft 801 by means of helicoidal ramps 804 which function in a manner to be described below.

A rotatable support 810 is carried by two series of bearings 811 and 812 for rotation about the first axis 840. The support 810 is formed with a cylindrical inner surface on an axis 841 (or second axis) which forms the angle a with axis 840 at the point S. The support 810 surrounds the rolling surfaces 805a and 805b rotating with shaft 801. A cylindrical (or second) element 807 is rotatably supported within the support on the axis 841 by two series of bearings 808 and 809. The cylindrical element 807 has two rolling surfaces 806a and 806b revolvable around the axis 841 and are generally cylindrical in configuration. These rolling surfaces are disposed symmetrically in relation to a plane 842 perpendicular to axis 841 at S. They are also mounted to be movable axially within element 807 and rotate integrally with the latter due to a system of cylindrical guides 813.

The rolling surfaces 806a and 806b of element 807 are adjustable axially by a hydraulic system by which fluid is delivered by flexible tubing (not shown) through a nipple 814 to a longitudinal channel 814 machined in the element 807. Channel 815 delivers the fluid to two annular chambers 816 and 817 situated at the ends of the second element, one face of which is respectively defined by a shoulder integral with the members defining the rolling surfaces 806a and 806b. The entry of a pressurized fluid in the annular chambers causes the axial displacement of the rolling tracks 806a and 806b for reasons which will become apparent from the description to follow below.

The position of the support 810 and bearings 811, 812, 808 and 809 allows the second element to veer around axis 841 and to maintain the angle of inclination a essentially constant.

Mounted integrally with one end (the lower end in FIG. 29) of the second element 807 are a plurality of bell-crank extensions 821, one for each piston, and pivotally connected at their projected ends with the pistons 822. The pivotal connection of the pistons to the extensions are located approximately in a plane 842 perpendicular to axis 841 at S.

Figure 29:
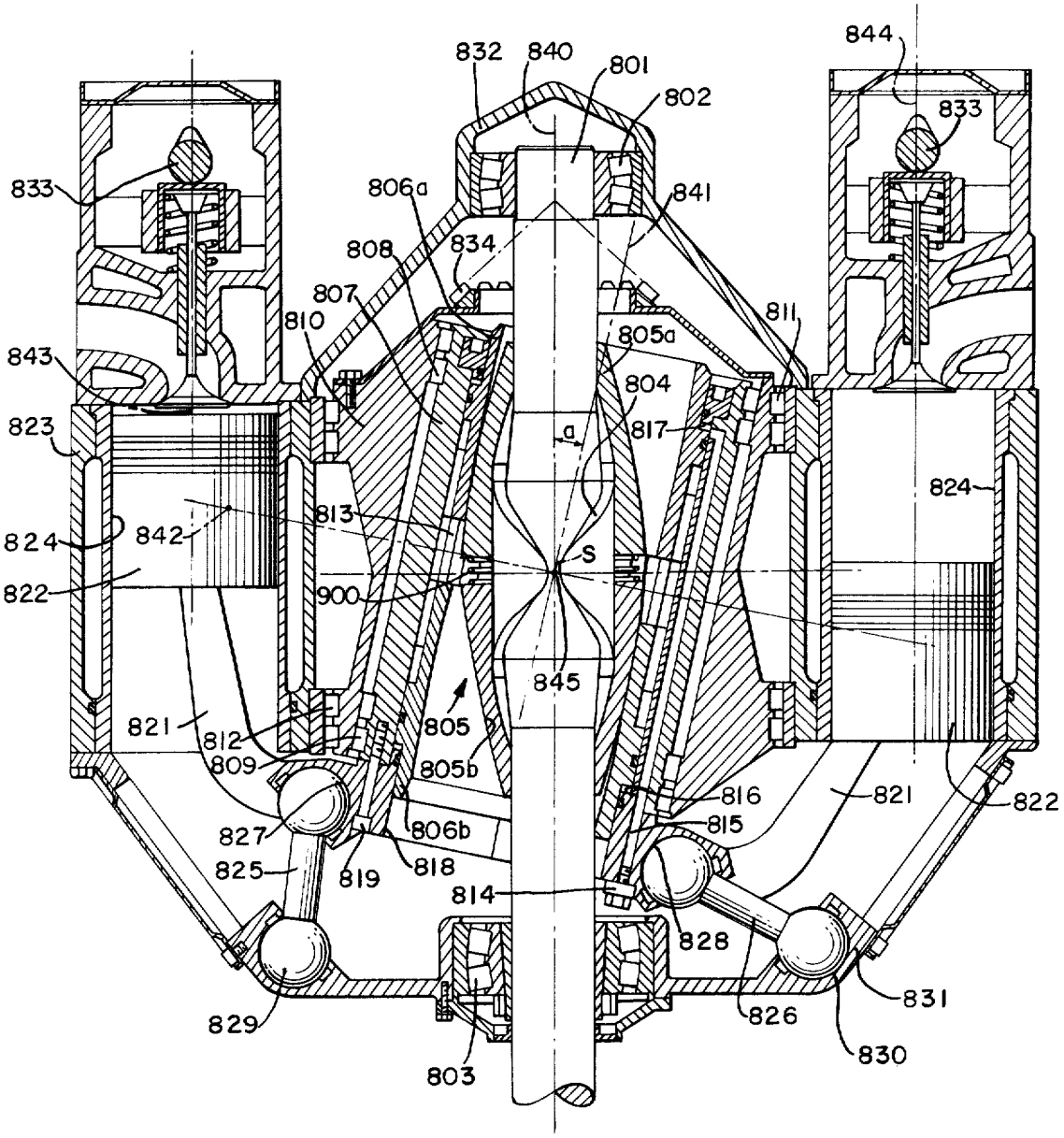
FIG. 29 is a longitudinal cross section taken through an alternative combined engine and transmission of the present invention.

It will be seen in FIG. 29 that the curved or bellcrank shape of the extensions 821 allows adequate free space around the second element so that the design of the support 810 may be simple and inexpensive.

To facilitate conversion of reciprocal piston thrust to a veering or nutating movement in the second element 807, connecting links are articulated both on a part 831 of the frame 832 and on the element 807 by ball-and-socket joints respectively 829, 830 and 827, 828. The joints 827 and 828 are mounted on an annular collar 818 mounted on the second element by bolts 819. The manner in which this assembly is constructed and arranged to achieve the desired motion of the second element 807 is shown schematically in FIG. 31. In this illustration, the first axis 840, the center S of veering or tilting, the second axis 841, the plane 842 perpendicular to the second axis 841 passing through S and the angle of inclination a of the second axis in relation to the first axis are schematically represented. Given the position of the centers 849 and 851 of the ball-and-socket joints 829 and 830, the position of the centers 848 and 850 of the ball-and-socket joints 827 and 828 as well as the lengths 852 and 853 and the links 825 and 826 can be determined.

In particular and starting from line 847 joining the centers S and 849, an angle 855 equal to angle a can be plotted. On a side 846 of this angle, a line equal in length to the distance between the end of the second element and the center S can be established. The position of the center 848 of ball-and-socket joint 827 is thus obtained. The length 852 of the link 825 is then given by the distance between the center 848 and 849. This design criterion applies to each of the links to be used.

Preferably, the center 849 is positioned so that when a piston 822 is at top dead center as shown in FIG. 29, the orientation of link 825 is about the same as that of axis 841. With these conditions, the maximum thrust of the pistons is best compensated.

Bevel gearing 834 rotating integrally with the support 810 rotates at the speed Wa of the second axis in relation to the first axis and is utilized for synchronizing the action of the auxiliary mechanism of the heat engine.

In operation, the alternating reciprocable motion of pistons 822 by the expansion of the fluid is transmitted by the extensions 821 a veering or nutating motion in the second element 807 due to the construction supporting frame 810. The rolling surfaces 806a and 806b rotate without slippage around the tracks 805a and 805b and therefore cause the latter as well as the shaft 801 to rotate around the first axis 840.

The kinematic relations linking the rotary speed Wa of the second element around the first axis at the speed W of shaft 801 are essentially the same as those described above.

Contact pressure between the respective surfaces 805a, 805b and 806a, 806b is developed by a system of helicoidal ramps 804 on which the conical members defining the surfaces 805a and 805b are threaded. It is known that the load on the shaft 801 creates a reaction couple opposing rotation of shaft 601. Such a reaction couple tends to produce an axial displacement of the surfaces 805a and 805b when the latter, entrained by the surfaces 806a and 806b of the second element 807, tend to rotate around the axis 840. This results in a pressure at the point of rolling surface contact approximately proportional to the reaction couple on the shaft 801.

A spring 900 is inserted between the two members defining the surfaces 805a and 805b. Its function is to apply the surfaces 805a and 805b against the surfaces 806a and 806b and to create sufficient contact pressure during the initial starting phase and in the case where the output torque is zero.

The mechanical system to produce the contact pressure is not the only one possible. It might be replaced by an elastic system having springs axially restraining the rolling surfaces 805a and 805b or by a hydraulic system lodged between shaft 801 and the rolling surfaces 805a and 805b.

To vary the ratio of transmission, the action of surfaces 806a and 806b by the hydraulic system described above, together with the action of the ramps 804, results in an axial displacement of surfaces 805a and 805b. This results in a longitudinal adjustment of the points of contact between the rolling surfaces 806a–805a and 806b–805b. This in turn results in a change of the gyrational radii of these contact points in relation to the first and the axis. Such a variation of these gyrational radii is translated into a variation of the transmission ratio.

It should be noted that the meridianal profile of the rolling surfaces is similar to, but a convex-concave reversal of the profile described above with respect to FIGS. 20–23. As such, these surfaces are well adapted to induce large variations of the contact-point positions by a slight change in the axial position of the rolling surfaces of the second element. In particular, the illustrated profile of the rolling surfaces is characterized by the fact that the radii of the meridian curve of the rolling surfaces are of the same order [to] *of* magnitude and of an order of magnitude indicated by the transverse dimensions of the transmission. The radius of this curvature is about equal to between 10 and 100 times the maximum transverse diamter of the rolling surfaces of the second element.

In a variant shown in FIG. 30, components described with reference to FIG. 29 are designated by reference numbers and no further explanation of such components is believed necessary. In this instance, two of the cylinders and pistons are located symmetrically in relation to point S. The extensions 821 are therefore mounted at opposite ends of the second element 807. This symmetrical position of the cylinders augments synchronization of their thermal cycle. In particular, this head-to-foot position of the cylinders allows an automatic compensation of the axial component of the piston thrust. Consequently, the system of links 825 and 826 described previously is not needed.

Otherwise, the functioning of this transmission is comparable, if not identical, to that of the first solution.

This invention has been illustrated in detail by two solutions for construction of a heat engine. It is obvious that the present invention covers any other coupling means having reciprocating motion. Specifically, in place of the receiver shaft 801 may be a motor shaft and the pistons 822 may be those of a compressor.

Figure 30:
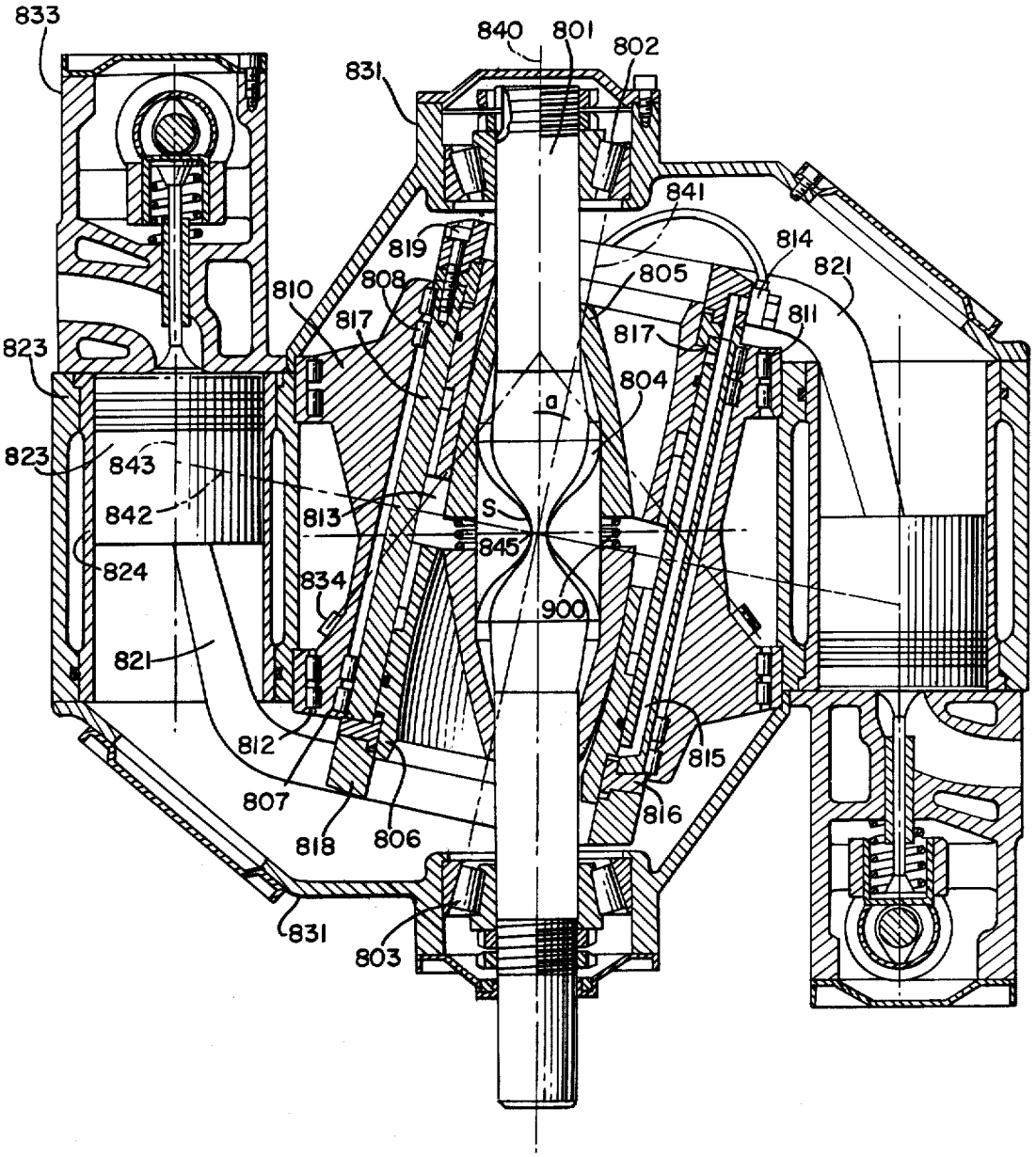
FIG. 30 is a similar cross section illustrating a variant of the embodiment of FIG. 29.
Figure 31:
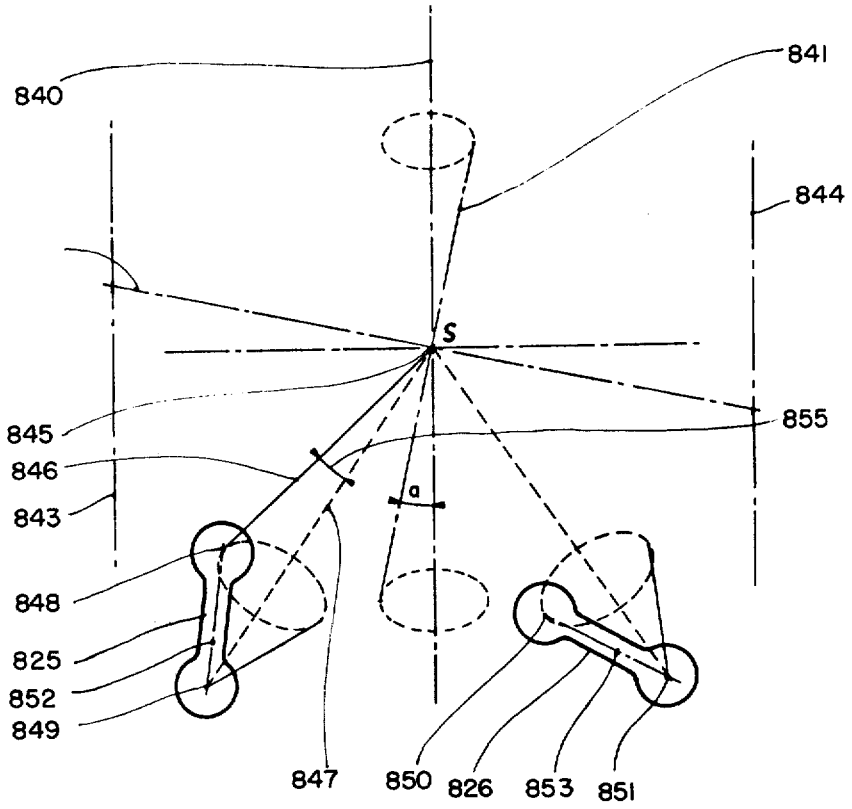
FIG. 31 is a line diagram illustrating the orientation of axes and pivot points of various of the components in the embodiment of FIG. 29.
Figure 32:
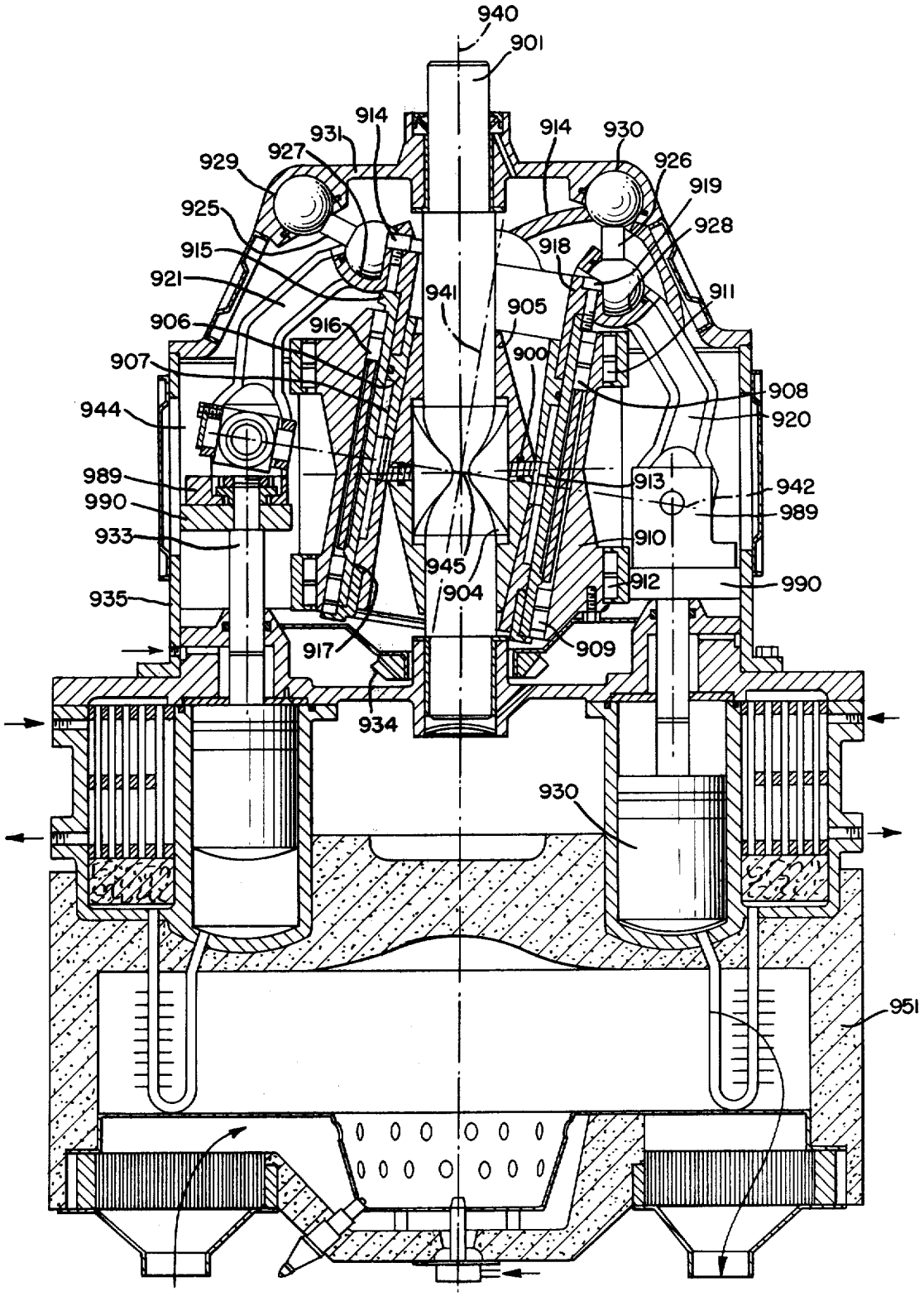
FIG. 32 is a longitudinal cross-section of a structural variation of the embodiment of FIGS. 29–31.

In FIG. 32, a constructional variation of the linkage and transmission of FIGS. 29–31 is combined with a Sterling engine. The reference numeral 951 thus generally designates the heat engine which employs the Sterling cycle previously described with respect to FIG. 24. In FIG. 32, most of the components already described in relation to FIGS. 24–31 are shown in FIG. 32 and designated by reference numerals having the same ten and unit integers but in a 900 series. The ensuing description, therefore, will be confined to the connections between the inwardly curved extensions 920 and 921.

It is to be noted with respect to FIG. 31, that the projecting ends of the extension describe a path around axes 843 and 844 of the cylinders which defines a circle when projected on a transverse plane and having a diameter D in the formula $D=E\ (1-\cos a)$ where E represents the distance between the axis 843 of the cylinder and the first axis 840. It is desirable, if not dispensable, therefore, to either design the joint of the projecting ends of the bell-crank like extensions in such a manner that the center of the joint will describe a circle around the axis of the piston or to design the piston in such a manner that the center of the joint will describe a circle around the axis of the piston or to design the piston in such a manner that the assembly of extension, joint and piston can describe a circle around the axis of the cylinder. Such a design may reside theoretically in providing a cylinder whose diameter is slightly larger than that of the piston in accordance with the above formula.

Thus in FIG. 32, dynamic coupling devices are shown to include a slide 989 which is at least partially cylindrical. This slide glides along the axis of the cylinder of the heat engine with a guide 990 which is at least partially cylindrical. The diameter of the slide is slightly smaller than the diameter of the guide. This difference in diameter is equal to D and is given by the formula $D=E\ (1-\cos a)$. The slide assembly is mounted at the end of the rod 933 that is connected to the piston 930 of the heat engine. It is mounted in such a manner that the slide can move freely in a transverse plane while still being linked with the rod in an axial direction. On the slide is mounted (in a well-known manner) a Cardan joint, one of whose parts is connected to the end of extension 921, the center of the Cardan joint being located in plane 942. Due to the ability of the slide to move laterally, it can follow the circular motion of the end of extension 921 while still being supported by one of its generatrices in cylindrical guide 990. Thus, the second element is constrained to rotate together with the frame. ($Wb=0$ and $Wb^*=Wa$).

Thus it will be seen that by the foregoing inventions there is provided a highly effective transmission having broad application to many uses and environments. That the invention may be manifested by numerous and diverse specific embodiments is evident from the numerous embodiments described. It is contemplated, however, that still further variations of the transmission as disclosed herein will be apparent to those skilled in the art from the preceding description. For example, it is fully within the contemplation of the present invention that the aforementioned generally conical surfaces be located on the innermost surface of the outermost cylindrical element rather than on the element which is positioned inside of such cylindrical element. Similarly, while the preferred embodiments of the present inventions are all restricted to a structure in which one of the first or second elements has rolling surfaces which, generally speaking, are the surfaces of cones having an apex half-angle equal to or slightly smaller than the angle of intersection of the first and second axes, certain features of the present inventions are themselves novel and patentable per se without regard to such conical arrangement. An example of such a per se novel feature is the provision for eliminating the degree of freedom of the second element so as to prevent it from pivoting about the point of axes intersection, the result of such freedom being to utilize the gyroscopic couple to counterbalance forces by which the rolling surfaces are held in frictional contact by mechanical means. Such feature could, accordingly, be used with advantage not only in the conical transmissions of the present application but in transmissions such as are disclosed in applicant's aforementioned U.S. Pat. No. 3,955,432. A further example of a per se novel feature is the use of a reciprocable input in combination with applicant's transmissions. While such reciprocable input is preferably used in combination with the conical arrangement described in the instant specification, it can also be used with transmissions such as are described in applicant's U.S. Pat. No. 3,955,432. Accordingly it is expressly intended that the described embodiments are exemplary only, not limiting, and that the true spirit and scope of the present inventions be determined by reference to the appended claims.

I claim:

1. A transmission device comprising a frame, drive input means, drive output means, and means interconnecting said input and output means including a first element having a first axis fixed relative to the frame, and a second element rotatable about a second axis intersecting said first axis at a point thereon, said second element being driven conically about said point on the first axis and circumferentially of said first axis, said first element having a pair of rolling surfaces disposed about said first axis one each side of the plane passing through the point of intersection of said axes and perpendicular to said first axis, said second element having a pair of rolling surfaces disposed about said second axis, one each side of the plane passing through the point of intersection of said axes and perpendicular to said second axis, rolling surfaces of one of said elements being the surfaces of cones having an apex half-angle substantially equal to the angle of intersection of said first and second axes, a gyroscopic action of said second element producing a couple [bringing] *holding the* respective rolling surfaces on said first and second elements [into] *in* rolling engagement at two points located one each side of the plane passing through the point of intersection of said axes and perpendicular to said first axis.

2. A transmission device as claimed in claim 1 wherein the second element has a degree of freedom in a direction parallel to the plane containing said first and second axes, which allows the rolling surfaces of said second element to come freely to lie against those of the first element under the gyroscopic action of said second element.

3. A transmission device as claimed in claim 1 wherein the two rolling surfaces of the first element are symmetrically arranged relative to the plane passing through the point of intersection of said first and second axes and perpendicular to the first axis, and the two rolling surfaces of the second element are symmetrically arranged relative to the plane passing through the point of intersection of said first and second axes and perpendicular to the second axis.

4. A transmission device as claimed in claim 1 wherein the center of gravity of the second element is located at the point of intersection of the first and second axes.

5. A transmission device as claimed in claim 1 wherein the second element is a substantially solid body of revolution.

6. A transmission device as claimed in claim 1 wherein the two rolling surfaces of the first element have a concave section in a transverse plane and have a convex toric section in a meridianal plane, and the two rolling surfaces of the second element are conical and convex in a transverse plane.

7. A transmission device as claimed in claim 1 including means for moving the rolling surfaces of at least one of the first and second elements relative to each other so as to vary the transmission ratio.

8. A transmission device as claimed in claim 7 wherein the axially movable rolling surfaces are those of the first element.

9. A transmission device as claimed in claim 1 including a drive transmission shaft, provided with a single truncated cylindrical part having as its axis said first axis and having at each end a respective support plate, the second element being provided with a pair of coaxial half shafts fixed relative thereto, bearings on the respective support plates rotatably supporting the half shafts, and the axis of the half shafts being said second axis.

10. A transmission device as claimed in claim 9 including sleeves which are prismatic in their external shape and which contain said bearings in which the two half shafts are supported, said sleeves being mounted in said support plates with play in a plane containing the first and second axes and with substantially no play in the direction perpendicular to this plane, whereby the second element is mounted on the support plates with a sufficient degree of freedom for it to be able to pivot about an axis perpendicular to the plane containing the first and second axes to bring the rolling surfaces of said first and second elements into engagement.

11. A transmission device as claimed in claim 1 including a drive transmission shaft, provided with a first support plate having as its axis said first axis, a support shaft having as its axis said second axis, said support plate being immovably secured to one end of said support shaft having as its axis said second axis, a second support plate freely pivotable about said first axis independently of said first support plate, the other end of the support shaft being immovably secured to said second support plate, and said second element being freely rotatable about said support shaft.

12. A transmission device as claimed in claim 11 including a cage prismatic in external form, bearings mounted in said cage, said support shaft passing through said bearings mounted in said cage, said prismatic cage being mounted in said second element with play in the plane containing said first and second axes, and no substantial play in the direction perpendicular to this plane, whereby the second element is mounted on the support shaft with a sufficient degree of freedom for it to pivot about an axis perpendicular to the plane containing the first and second axes.

13. A transmission device as claimed in claim 1 including a drive transmission shaft, a gear-train linking said second element to said drive transmission shaft, said linking gear train comprising three conical convex gears having a common apex at the point of intersection of said first and second axes, a first of the gears having as its axis said second axis and being mounted for rotation with the second element about the second axis, a second of the gears meshing with the first, a shaft carrying said second gear and having an axis passing through the point of intersection of said first and second axes, a satellite support plate rotatable about said first axis and rotatably mounting the second gear on the axis of said last-mentioned shaft, and the third of the gears meshing with the second gear and having as its axis said first axis, and said third gear being carried by said drive transmission shaft.

14. A transmission device as claimed in claim 1 including a first drive transmission shaft provided with a single truncated cylindrical part having as its axis the said first axis and having at each end a respective support plate, the second element being provided with a pair of coaxial half shafts fixed relative thereto and rotatably supported in bearings on the respective support plates, the axis of the half [sheets] *shafts* being the said second axis, and a second drive transmission shaft rotationally linked to the second element by means of a [fear] *gear* train comprising three conical convex gears having a common apex being the point of intersection of said first and second axes, a first of the gears having as its axis said second axis and being mounted for rotation with the second element about the second axis, a second of the gears meshing with the first, and being carried rotatably by a shaft the axis of which passes through the point of intersection of said first and second axes, said shaft being mounted in a satellite support plate which satellite support plate is rotatable about said first axis, and the third of the gears meshing with the second gear and having as its axis said first axis, said third gear being carried by said second drive shaft and said satellite support plate being immovably secured to said first drive transmission shaft.

15. A transmission device as claimed in claim 1 wherein the second element is rotationally linked to a drive transmission shaft by means of a gear-train, said linking gear train comprising two conical convex gears having a common apex being the point of intersection of said first and second axes, a first of these gears having as its axis said second axis and being mounted for rotation with the second element about said second axis, the second of the gears meshing with the first and having as its axis said first axis, said second gear being borne by said drive transmission shaft.

16. A transmission device as claimed in claim 1 wherein the second element is rotationally linked to a drive transmission shaft by nmeans of a gear-train, said linking gear train comprising two conical gears having a common apex being the point of intersection of said first and second axes, a first of the gears being convex and having as its axis said second axis, said first gear being mounted for rotation with the second element about said second axis, the second of the gears meshing with the first and being concave, said second gear having as its axis said first axis and being mounted for rotation with said drive transmission shaft.

17. A transmission device as claimed in claim 8 wherein the first element comprises two parts axially movable relative to each other and on which the two reaction surfaces of the first element are formed, the two parts of the first element being mounted in slidable fashion in a support casing having as its axis said first axis, said support casing being rotationally linked to a drive transmission shaft.

18. A transmission device as claimed in claim 8 wherein the member for varying the relative axial position of the two reaction surfaces of the first element comprises a rod the axis of which is parallel to said first axis, said rod being threaded, having two identical portions of opposite thread and being rotatable about its axis by a control member.

19. A transmission device as claimed in claim 17 wherein the member for varying the relative axial position of the two reaction surfaces of the first element comprises a rod the axis of which is parallel to said first axis, said rod being threaded, having two identical portions of opposite thread and being rotatable about its axis by a control member.

20. A transmission comprising a frame, drive input means, drive output means, and means interconnecting said input and output, said interconnecting means comprising a plurality of transmission devices each including a first element having a first axis fixed relative to the frame, and a second element rotatable about a second axis intersecting said first axis at a point thereon, said second element being driven conically about said point on the first axis and circumferentially of said first axis, said first element having a pair of rolling surfaces disposed about said first axis one *on* each side of the plane passing through the point of intersection of said axes and perpendicular to said first axis, said second element having a pair of rolling surfaces disposed about said second axis, one *on* each side of the plane passing through the point of intersection of said axes and perpendicular to said second axis, the rolling surfaces of one of said elements being the surfaces of cones having an apex half-angle substantially equal to the angle of intersection of said first and second axes, a gyroscopic action of said second element producing a couple bringing respective rolling surfaces on said first and second elements into rolling engagement at two points located one *on* each side of the plane passing through the point of intersection of said axes and perpendicular to said first axis, and the transmission devices being coupled so that the resultant of the gyroscopic couples to which the second elements of the transmission devices are subjected is substantially zero.

21. A transmission as claimed in claim 20 including three transmission devices mounted in a star shape at intervals of 120° about a general axis of the transmission, the two rolling surfaces of the first elements being common, and locked against rotation on the frame about the said general axis.

22. A transmission device as claimed in claim 1 wherein means are provided respectively rotationally linking drive transmission shafts to the angular velocity of the first element about said first axis, the angular velocity of said second element about said second axis, and the angular velocity of nutation of said second axis about said first axis, and rotational coupling means being provided between at least two of the shafts.

23. A transmission device comprising: a frame, drive input means, drive output means, and means interconnecting said input and output means including a first element having a first axis fixed relative to the frame, [and] a second element having a second axis intersecting said first axis at a point thereon, *and support means to engage said second element on said second axis at opposite sides of said point, said support means being rotatable on said first axis under a torque couple driving* said second element [being driven] conically about said point on said first axis and circumferentially of said first axis, said first element having a pair of rolling surfaces disposed about said first axis, one on each side of a first plane passing through said point of axes intersection and perpendicular to said first axis, said second element having a pair of rolling surfaces disposed about said second axis, one on each side of a second plane passing through said point of axes intersection and perpendicular to said second axis, the respective rolling surfaces on said first and second elements being in rolling frictional engagement at two points in a third plane containing said first and second axes and located one on each side of said first plane, and the rolling surfaces of one of said elements being the surfaces of cones having an apex half-angle related to the angle of intersection between said first and second axes in a manner to enable the spacing between said respective two points of rolling frictional engagement and said point of axis intersection to be adjusted along the length of said rolling surfaces for any given angle of said first and second axes intersection, and means for forcing said respective rolling surfaces of said first and second elements into rolling friction engagement with each other at said two points.

24. The apparatus recited in claim 23 wherein said means for forcing said rolling surfaces into rolling friction engagement includes means to develop a gyroscopic couple tending to tilt said second element about said point of axes intersection.

25. The apparatus recited in claim 24 wherein said means to develop a gyroscopic couple causes said *gyroscopic* couple to act in a direction forcing said respective rolling surfaces into engagement with each other at said two points.

26. The apparatus recited in claim 25 [including] *wherein said support* means [to support at least one of] *supports* said [first and] second [elements] *element* with limited pivotal freedom in said third plane so that said rolling frictional engagement is maintained only by said gyroscopic couple.

27. The apparatus recited in claim 24 wherein said means for forcing said respective rolling surfaces into engagement with each other at said two points develops a second force couple between said first and second elements, said means to develop said gyroscopic couple causing said gyroscopic couple to act in a direction to counteract said second force couple.

28. The apparatus recited in claim 23 including means to shift said two points of rolling friction engagement axially toward and away from said point of axes intersection thereby to vary the speed ratio of said drive input means and said drive output means in accordance with the radius of said cones at said two points of rolling friction engagement.

29. The apparatus recited in claim 23 wherein said cones have an apex half-angle equal to said angle of intersection.

30. The apparatus recited in claim 23 wherein said cones have an apex half-angle less than said angle of axes intersection.

31. The apparatus recited in claim 23 wherein the generatrix of each of said cones is a curve.

32. The apparatus recited in claim 31 in which the generatrix of each of said cones is curved in a meridianal plane to provide a concave surface conformation.

33. The apparatus recited in claim 31 in which the generatrix of each of said cones is curved in a meridianal plane to provide a convex surface conformation.

34. The apparatus recited in claim 23 in which the generatrix of the rolling surfaces of each of said first and second elements is a curve having a radius between about 10 and 100 times the average distance of each said surface from the axis of revolution thereof.

35. The apparatus recited in claim 23 in which said rolling surfaces of both said first and second elements are surfaces developed by revolution of curved generatrices about said first and second axes respectively, the surface generatrix of one of said elements having a curve radius different from the curve radius of the surface generatrix of the other of said elements, thereby to ensure contact of said rolling surfaces at said two points.

36. The apparatus recited in claim 35 wherein the surface of revolution on one of said elements is convex and the surface of revolution on the other is concave in a meridianal plane.

37. The apparatus recited in claim 23 wherein said drive input means comprises reciprocable drive means disposed symmetrically about said first axis for reciprocation on axes parallel to said first axis and spaced equally therefrom, and including means connecting said reciprocable drive means and said second element to drive said second element conically about said first axis.

38. The apparatus recited in claim 23 wherein said second element is a solid of revolution having a center of mass coincident with said point of axes intersection, and means rotatable on said first axis and rotatably linked with opposite ends of said second element.

39. The apparatus recited in claim 38 wherein said last mentioned means is a support for said second element fixing the position of said second axis relative to said first axis.

40. The apparatus recited in claim 23 wherein the rolling surfaces of said first element are symmetrically arranged with respect to said first plane and wherein the rolling surfaces of said second element are symmetrically arranged with respect to said second plane.

41. In a transmission device having a frame, drive input means, and drive output means, means interconnecting said input and output means comprising:

a first element on a first axis fixed in the frame and having rolling surfaces of revolution about said first axis, one such rolling surface on each side of a first plane perpendicular to said first axis at a point of axes intersection;

a second element on a second axis intersecting said first axis at said point of axes intersection and having concentric journal and rolling surfaces of revolution about said second axis, the rolling surfaces of said second element being disposed one on each side of a second plane passing through said point of axes intersection and perpendicular to said second axis *said journal surfaces also being disposed one on each side of said second plane;* support means rotatable on said first axis and journalled with said journal surfaces to support said second element *in a manner to positively establish the angle of intersection between said first and second axes and* for movement *of said second element and said second axis* in a biconical path circumferentially of said first axis, [the apex of] said biconical path [being] *having a central apex* coincident with said point of axes intersection *and diverging oppositely from said central apex at a rate of divergence established by the support of said second element from said support means;* the respective rolling surfaces on said first and second elements being symmetrical with respect to said point of axes intersection and being in rolling frictional engagement at two points of contact in a third plane containing said first and second axes and located one on each side of said first plane;

the rolling surfaces of at least one of said elements being defined by generatrices inclined oppositely with respect to the axis of revolution thereof, thereby to provide in the respective rolling surfaces of said first and second elements a variable ratio of rolling surface radii at said points of contact for variation in the spacing of said points of contact from said first plane; and means for forcing said respective rolling surfaces on said first and second elements into rolling friction engagement with each other at said two points.

42. The apparatus recited in claim 41 wherein [said point] *the angle* of first and second axes intersection is fixed with respect to said frame.

43. The apparatus recited in claim 41 wherein said means for forcing said respective rolling surfaces into engagement at said two points includes thrust means to cause relative movement of said rolling surfaces of one of said elements and said rolling surfaces of the other of said elements on the respective axes of said elements thereby to develop a force vector normal to said surfaces.

44. The apparatus recited in claim 41 wherein said rolling surfaces of said second element are defined by two annular rings concentric with said second axis, said annular rings being coupled for angular movement with said second element but movable axially with respect to each other on said second element in the longitudinal direction of said second axis.

45. The apparatus recited in claim 44 including cone members to define said rolling surfaces of said first element as conical surfaces of revolution, said cone members being carried by said first element and movable toward and away from said first plane.

46. The apparatus recited in claim 45 wherein said annular rings are movable away from said second plane by inertial forces and movable toward said second plane by axial extension of said cone members.

47. The apparatus recited in claim 46 in which the apical half-angle of said respective conical surfaces of revolution is less than the angle of intersection of said first and second axes.

48. The apparatus recited in claim 45 wherein the apical half-angle of each of said conical surfaces is less than the angle of said first and second axes intersection and including a spring system biasing said annular rings in a direction away from said second plane.

49. The apparatus recited in claim 45 including a pressurized fluid system for moving said cone members axially away from said first plane.

50. The apparatus recited in claim 45 wherein said drive output means is a shaft rotatable on said first axis with said first element and including oppositely inclined helicoidal ramps for moving said cone members toward and away from said first plane.

51. The apparatus recited in claim 44 comprising gear linkage means to provide axial movement of said annular rings toward and away from said second plane to vary the speed ratio of said input drive means and said output drive means.

52. The apparatus recited in claim 44 comprising sleeve means annularly adjustable with respect to said second element, said sleeve means being formed with ramps engagable by said annular rings thereby to move said annular rings axially toward and away from said second plane upon relative rotation of said sleeve means and said second element.

53. The apparatus recited in claim 41 including means rotatably linking said second element to said frame.

54. The apparatus recited in claim 41, wherein said drive output means comprises an output shaft connected for rotation with said first element.

55. The apparatus recited in claim 41 including means rotatably linking said first element to said frame and including a rotatable crankcase on said first axis around said support and said elements, and means rotatably linking said second element with said crankcase.

56. The apparatus recited in claim 53 wherein said rotatable linking means comprises a radial diaphragm interconnecting said second element and said frame in a manner to prevent relative circumferential movement between said second element and said frame but to allow relative movement between said second element and said frame in a radial direction at least at said two points of rolling friction.

57. The apparatus recited in claim 53 wherein said rotatable linking means comprises a conical gear fixed to said frame on said first axis and converging at said point of first and second axes intersection, and another conical gear fixed to said second element on said second axis and also converging on said point of axes intersection.

58. The apparatus recited in claim 55 wherein said drive input means is coupled for rotation with said crankcase and said drive output means coupled for rotation with said support means.

59. The apparatus recited in claim 57 wherein the ratio of said conical [gearsis] *gears is* 1:1.

60. The apparatus recited in claim 54 wherein said drive input means comprises an input shaft connected for rotation with said support means.

61. The apparatus recited in claim 54 wherein said drive input means comprises reciprocable drive means disposed symmetrically about said first axis for reciprocation on axes parallel to said first axis and spaced equally therefrom, and including means for connecting said reciprocable drive means and said second element to drive said second element conically about said first axis.

62. The apparatus recited in claim 23 wherein the center of gravity of said second element is located at said point of first and second axes intersection.

63. The apparatus recited in claim 41 wherein said means to support said second element is journalled in the frame for rotation on said first axis and journalled with said second element for relative rotation of said second element and said support means about said second axis.

64. The apparatus recited in claim 63 wherein said means to support said second element is a torque transmitting member having opposite ends journalled in the frame on said first axis and a tube-like section extending between said opposite ends.

65. The apparatus recited in claim 64 wherein said tube-like section is concentric with said second axis and journalled directly with said second element on opposite sides of said second plane.

66. The apparatus recited in claim 65 wherein said second element includes exterior journal surfaces concentric with said second axis and wherein the interior of said tube-like section is journalled with said exterior journal surfaces.

67. The apparatus recited in claim 65 wherein said tube-like section extends radially between said first and second elements and is formed having diammetrically opposite, axially spaced openings to enable said rolling surfaces to engage at said two points of contact.

68. The apparatus recited in claim 67 wherein said second element includes interior journal surfaces concentric with said second axis and wherein said means to support said second element extends within and is journalled with said interior journal surfaces.

69. In a transmission device having a frame, drive input means and drive output means, means interconnecting said input and output means comprising:

a first element on a first axis fixed in the frame and having rolling surfaces of revolution about said first axis, one such rolling surface on each side of a first plane perpendicular to said first axis at a point of axes intersection;

a second element having rolling surfaces of revolution about a second axis intersecting said first axis at said point of axes intersection and at an angle of axes intersection, the rolling surfaces of said second element being disposed one one each side of a second plane passing through said point of axes intersection and perpendicular to said second axis;

means to support said second element *symmetrically on opposite sides of said point of axes intersection* from the frame to [establish] *fix* said angle of intersection and so that the rolling surfaces on said elements may be in rolling friction engagement at two points of contact in a third plane containing said first and second axes, said points of contact being located symmetrically with respect to said point of axes intersection;

the rolling surfaces of both said elements being symmetrical with respect to said point of axes intersection and the rolling surfaces of at least one of said elements being defined by generatrices inclined oppositely with respect to the axis of revolution thereof, the rate of inclination of said generatrices being related to said angle of intersection so as to effect a ratio of rolling surface radii at said points of contact dependent on the spacing of said points of contact from said point of axes intersection;

means for forcing said respective rolling surfaces on said first and second elements into rolling frictional engagement with each other at said two points; and means to adjust simultaneously the spacing of said points of contact from said point of axes intersection thereby to vary the speed ratio of the drive input and drive output means.

* * * * *